Oct. 5, 1943.  G. F. DALY  2,330,957
ACCOUNTING MACHINE
Filed March 18, 1941  16 Sheets-Sheet 2

INVENTOR
George F. Daly
BY
ATTORNEY

Oct. 5, 1943. G. F. DALY 2,330,957
ACCOUNTING MACHINE
Filed March 18, 1941 16 Sheets-Sheet 3

INVENTOR
George F. Daly
BY
ATTORNEY

Oct. 5, 1943.    G. F. DALY    2,330,957
ACCOUNTING MACHINE
Filed March 18, 1941    16 Sheets-Sheet 5

INVENTOR
George F. Daly
BY
ATTORNEY

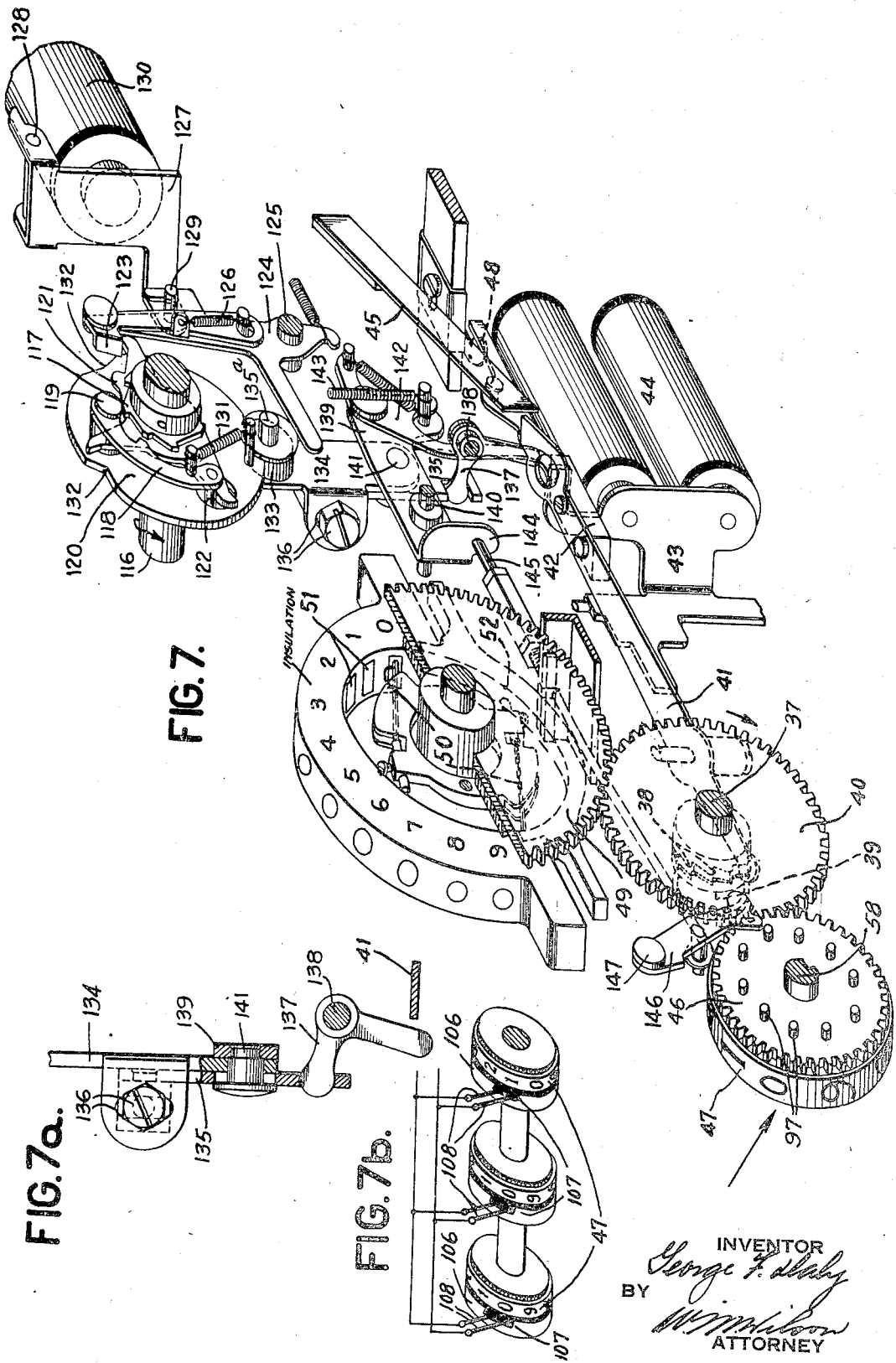

Oct. 5, 1943.  G. F. DALY  2,330,957
ACCOUNTING MACHINE
Filed March 18, 1941  16 Sheets-Sheet 7

| | IA | IB | II | III | IV | V | VI | VII |
|---|---|---|---|---|---|---|---|---|
| 17 | 1 | 2 | 100 | | 100 | 200 | | 200 |
| 17 | 3 | 4 | 200 | 600 | -300 | | 1200 | 1200 |
| 17 | 7 | | 700 | 150 | 250 | 250 | | |
| 17 | 8 | | 75 | | 325 | 325 | | |
| 17 | 9 | 16 | 200 | | 525 | 8400 | | 8400 |
| 17 | 25 | 3 | 500 | | 1,025 | 3075 | | 3075 |
| 17 | 28 | | | 1200 | -175 | | 175 | |
| 17 | 29 | | | 150 | -325 | | 325 | |
| 17 | 30 | 2 | 260 | 90 | -155 | | 310 | 310 |
| | | | | | | 12250 | 2010 | |

ACCT. DATE DAYS DEBITS  CREDITS  BALANCE  DEBITS  CREDITS  PRODUCTS
TOTAL TABLE OF INTEREST

INVENTOR
George F. Daly
BY
ATTORNEY

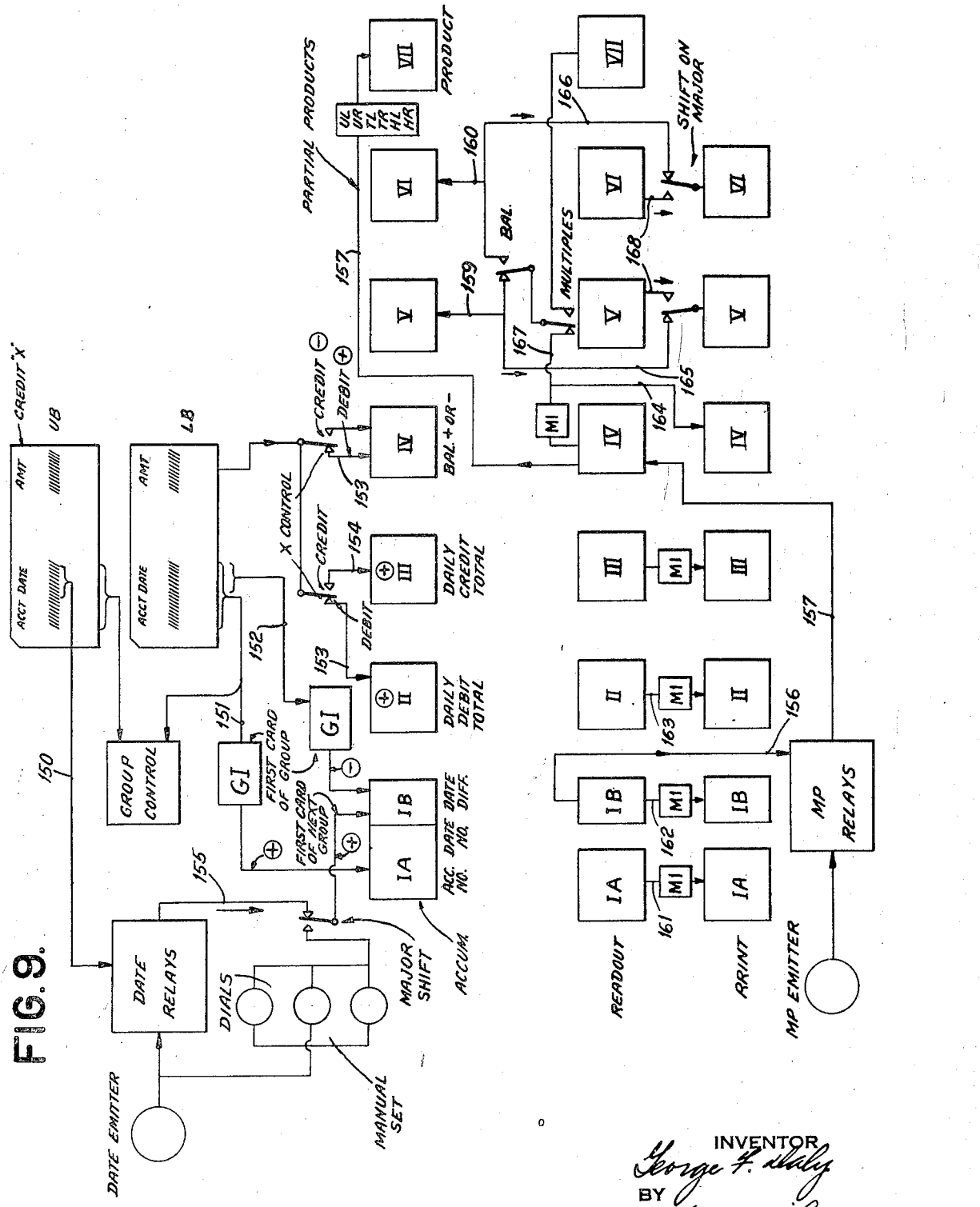

Oct. 5, 1943.  G. F. DALY  2,330,957
ACCOUNTING MACHINE
Filed March 18, 1941   16 Sheets-Sheet 9
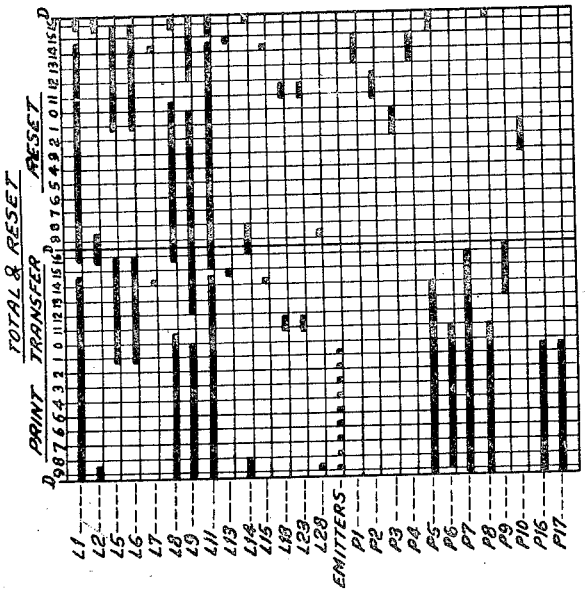
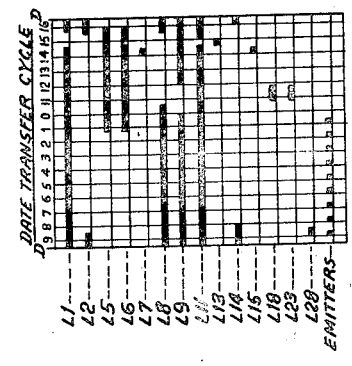
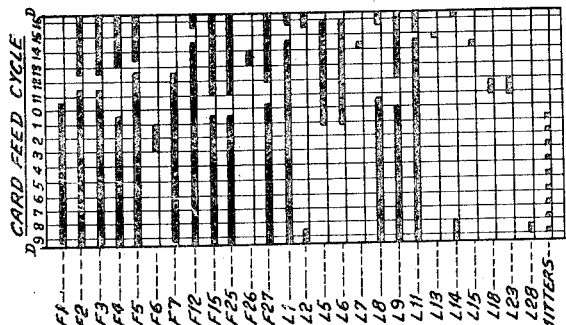
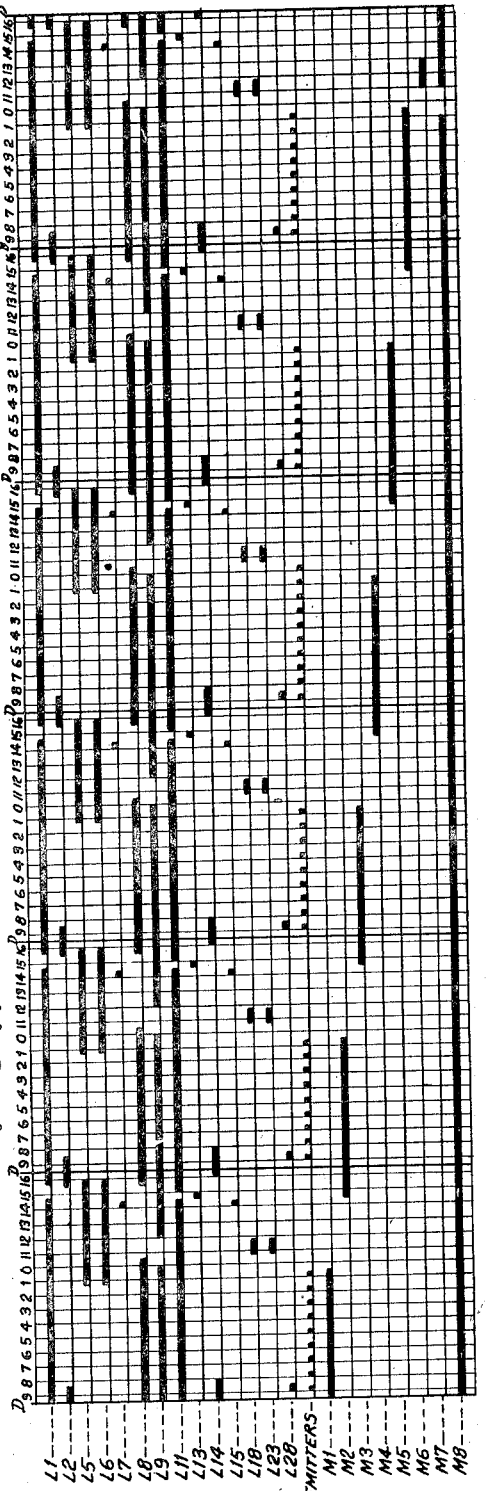
INVENTOR
George F. Daly
BY
ATTORNEY

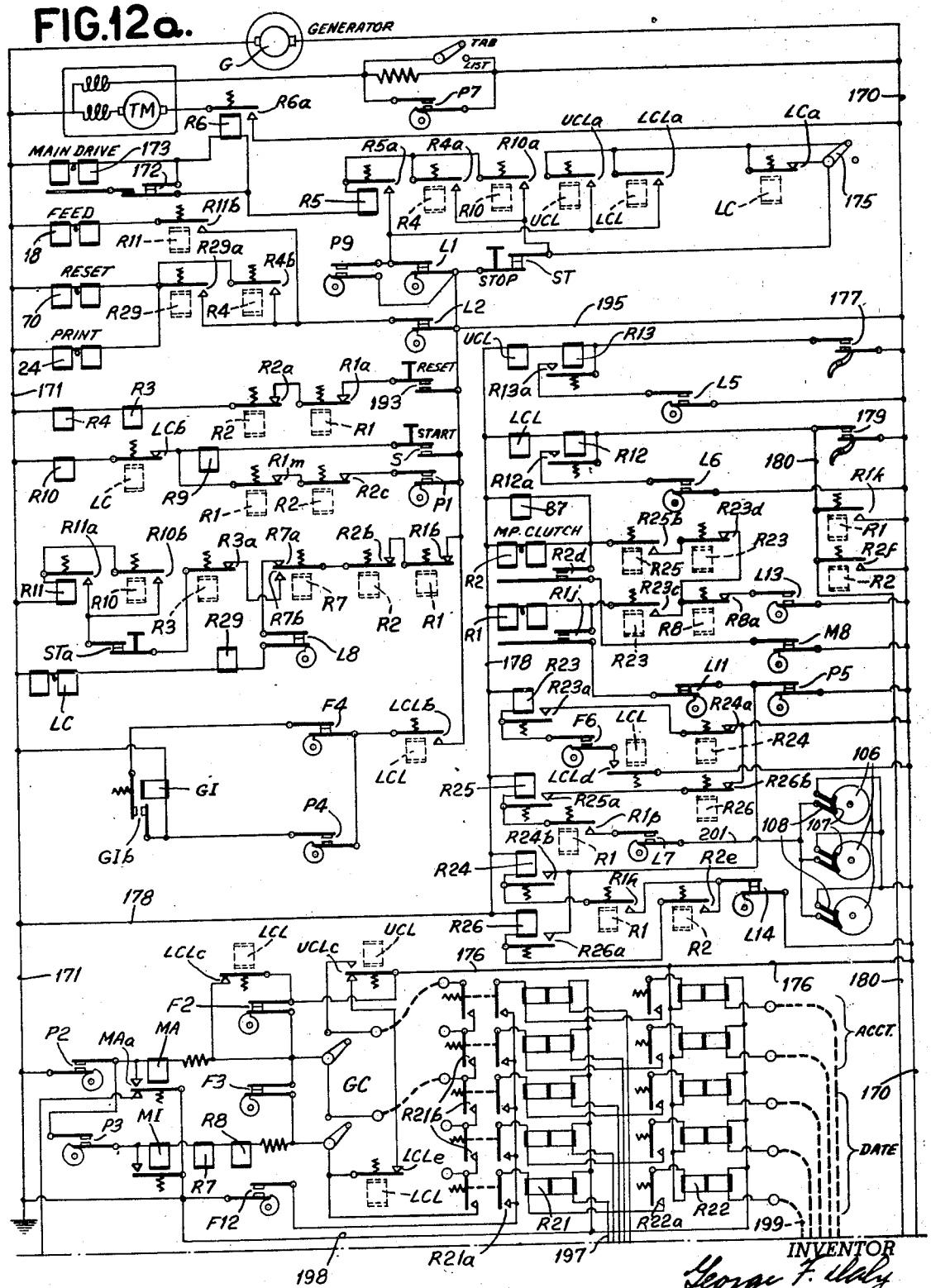

Oct. 5, 1943.   G. F. DALY   2,330,957
ACCOUNTING MACHINE
Filed March 18, 1941   16 Sheets-Sheet 12

INVENTOR
George F. Daly
BY
ATTORNEY

Oct. 5, 1943.                G. F. DALY                 2,330,957
                       ACCOUNTING MACHINE
                    Filed March 18, 1941        16 Sheets-Sheet 13

Oct. 5, 1943.  G. F. DALY  2,330,957
ACCOUNTING MACHINE
Filed March 18, 1941   16 Sheets-Sheet 14

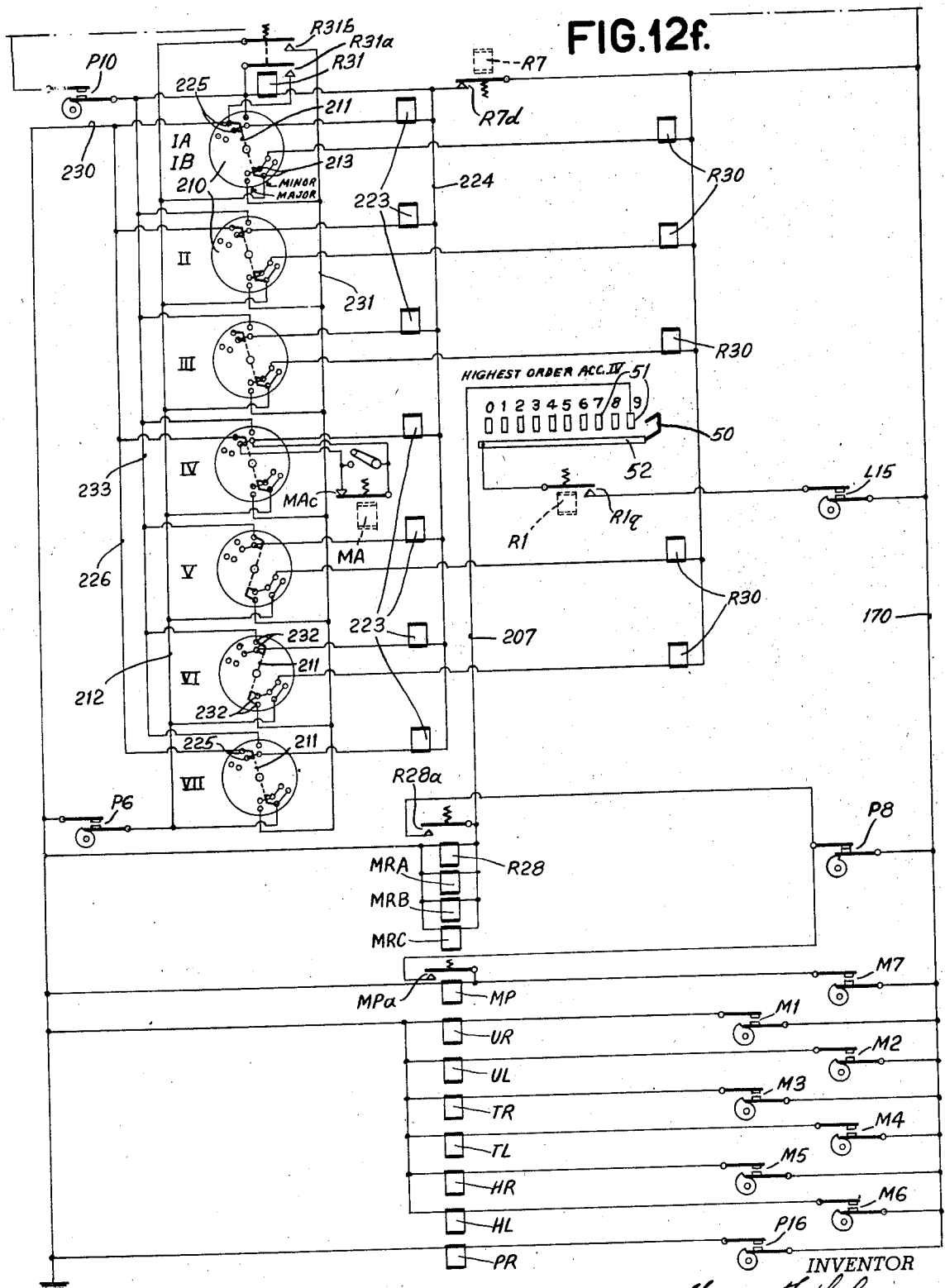

Oct. 5, 1943.  G. F. DALY  2,330,957
ACCOUNTING MACHINE
Filed March 18, 1941   16 Sheets-Sheet 16

INVENTOR
George F. Daly
BY
W. M. Wilson
ATTORNEY

Patented Oct. 5, 1943

2,330,957

UNITED STATES PATENT OFFICE 2,330,957

ACCOUNTING MACHINE

George F. Daly, Endicott, N. Y., assignor to International Business Machines Corporation, New York, N. Y., a corporation of New York Application March 18, 1941, Serial No. 383,914

8 Claims. (Cl. 235—61.8)

This invention concerns accounting machines and more particularly accounting machines of the perforated record controlled type.

The principal object of the invention is to provide a machine for handling problems of accounting in which multiplying operations are required in an improved manner. The machine finds particular utility in banking institutions for the calculation of so-called "daily balance totals" upon which interest is to be calculated.

It is the practice in certain banks to prepare a perforated record card for each transaction that takes place between the bank and a customer. Upon such record may be entered the customer's account number, the date of the transaction, the amount, and an indication as to whether the amount is to be credited or debited to the account. At the end of an accounting period, which may be any selected period, there will be a group of cards containing one card for each transaction. In order to obtain the desired interest figure, which is the sum of the daily balances for the entire period, the machine under control of the group of cards calculates the daily balance for each day upon which a transaction occurs. Where there are intervals of inactivity, the machine determines the number of days between transactions and automatically multiplies this number by the earlier day's balance which gives a product which is added to other daily balances to produce the sum of the daily balances.

A specific object is to provide improved mechanism for determining the difference in number of days between transactions in a system as stated and automatically calling into action partial product multiplying devices to obtain a product, of which the difference obtained is one of the factors.

A further object resides in the provision of means for causing selective operation of the machine whereby, when a daily balance is calculated and obtained in an accumulator, this balance is multiplied by the difference in days and the product obtained entered into a table of interest accumulated only when the difference is greater than unity. When the difference is unity, the multiplying operations are eliminated and the balance is directly transferred to the latter accumulator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 7 is an isometric of one order of a subtracting accumulator.

Fig. 7a is a detail of certain parts shown in Fig. 7.

Fig. 7b is a detail of special contact disks in accumulator IB.

Fig. 9 is a "flow" diagram showing the disposition of data amounts in the several units.

Fig. 10 shows the timing of the F and L cams during card feed cycles.

Fig. 10a shows the timing of the L cams during date transfer cycles.

Fig. 11 shows the timing of the L and P cams during total and reset transfer cycles.

Fig. 11a shows the timing of the M and L cams during multiplying cycles.

Figs. 12a to 12f taken together and arranged in order comprise a wiring diagram of the electric circuits of the machine.

Figure 13:
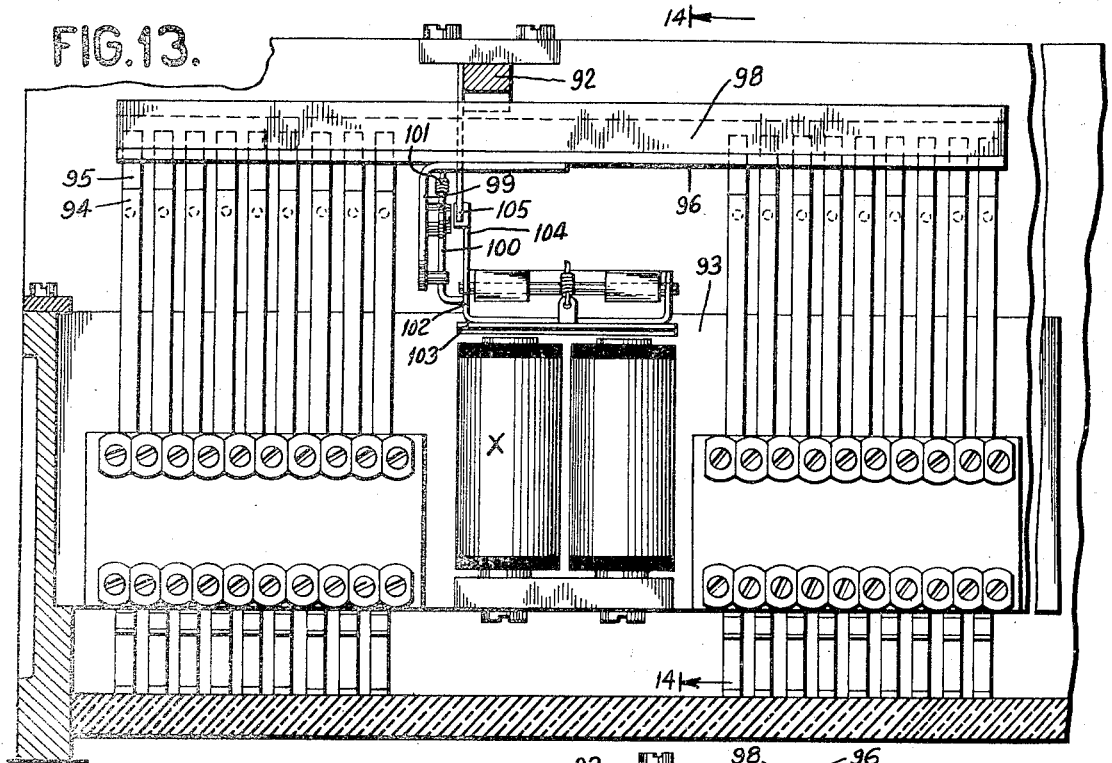
Figure 14:
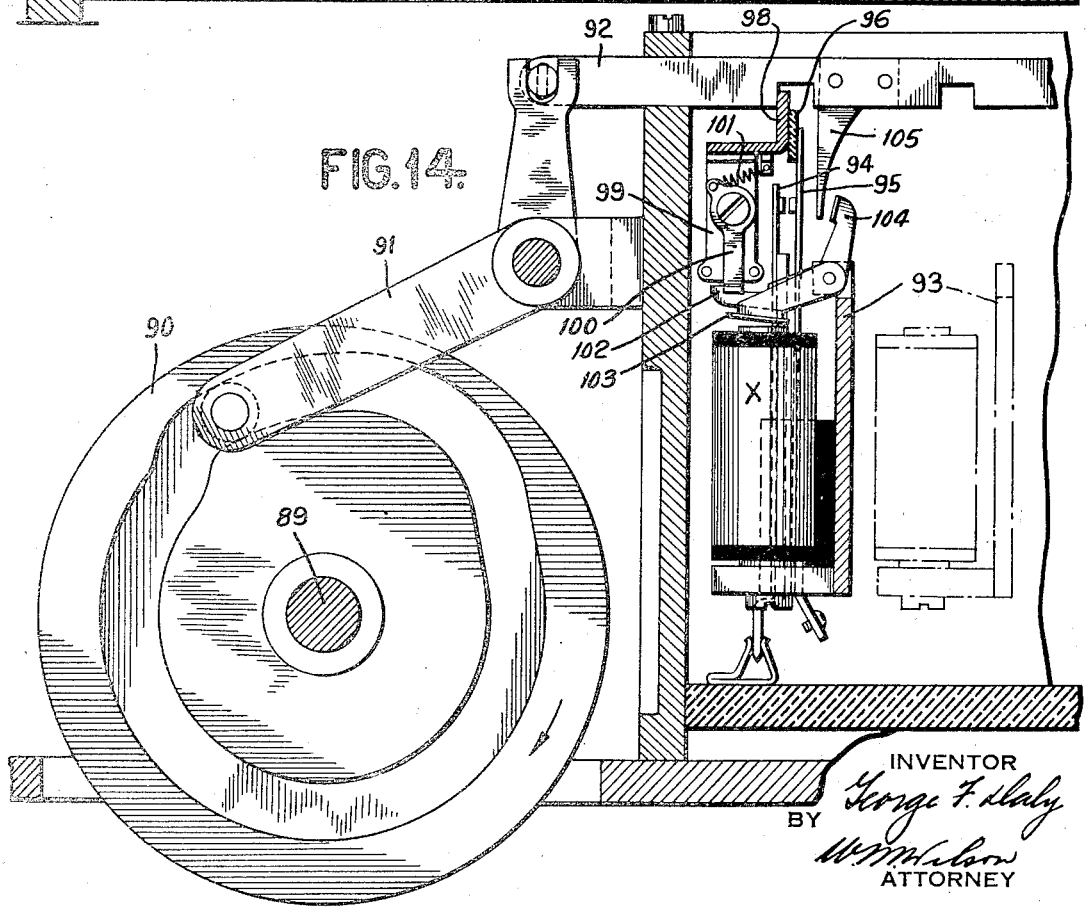

Figs. 13 and 14 are details of the multiplying relays.

The machine to which the features of the present invention are applied is similar in its mechanical organization to that shown in my Patent No. 2,126,621, issued August 9, 1938, with certain modifications as will be pointed out hereinafter. The structure of the machine will first be briefly explained before the operation is set forth in connection with the circuit diagram.

Card feeding mechanism

Figure 1:
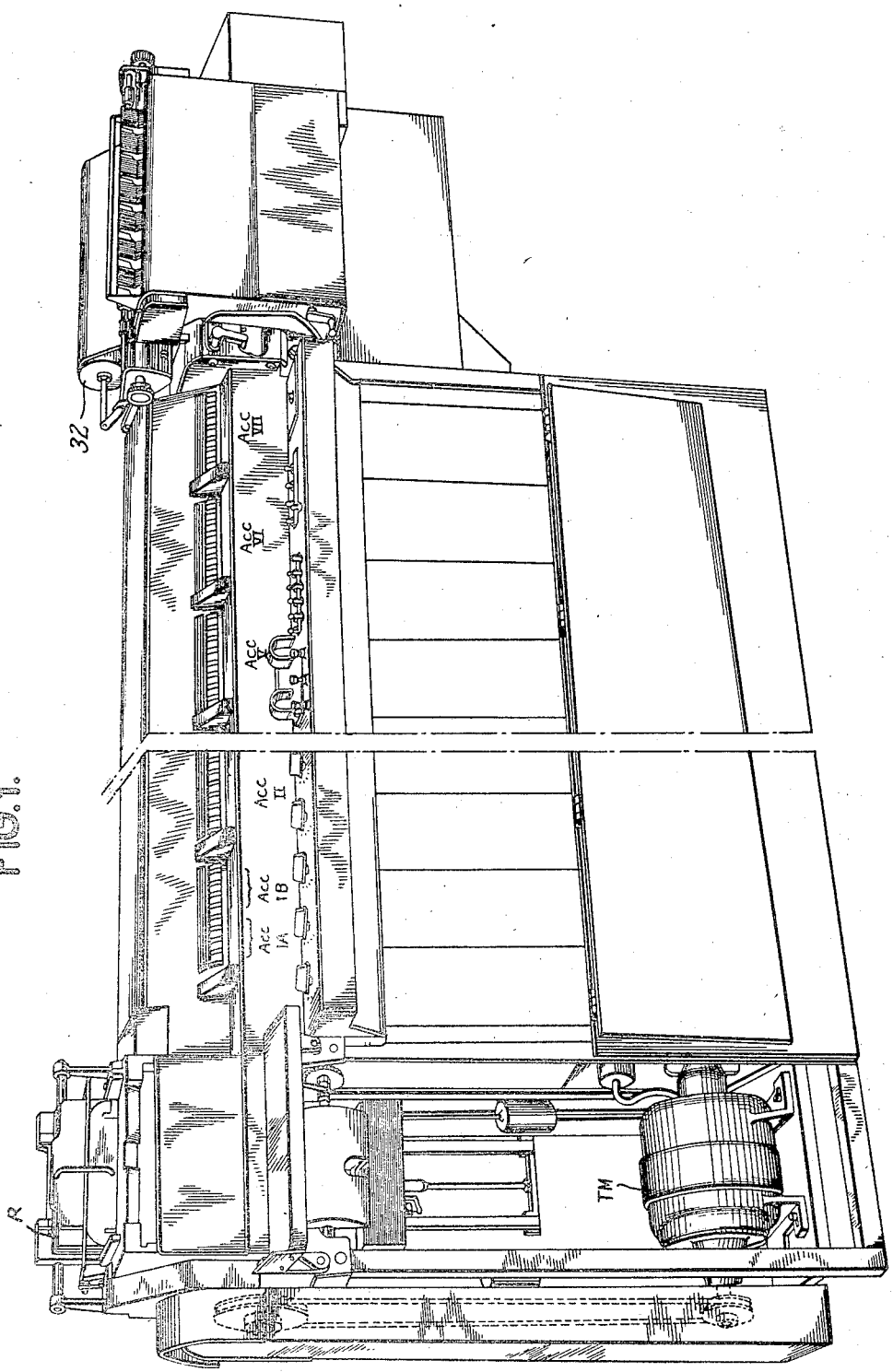
Fig. 1 is an isometric view of the entire machine showing the relationship of the various units.
Figure 2:
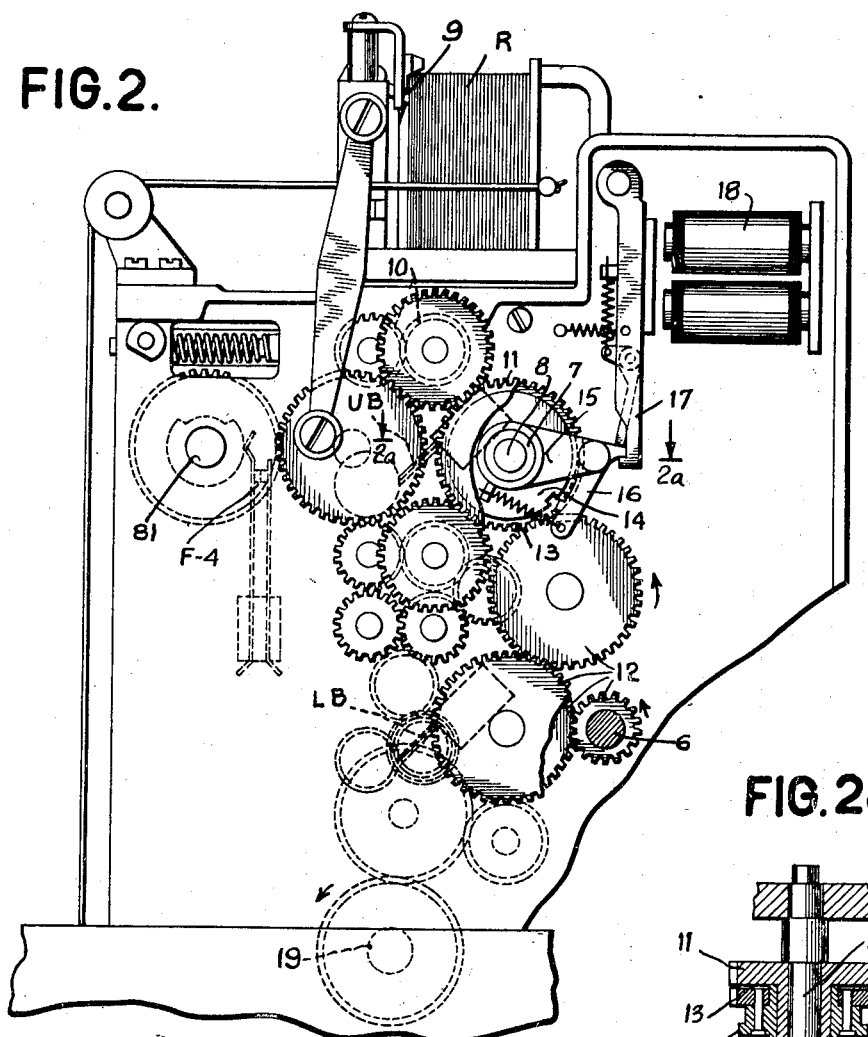
Fig. 2 is a side view looking from the left in Fig. 1 showing the drive gearing of the card feeding and analyzing unit.
Figure 2A:
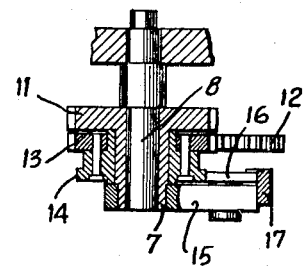
Fig. 2a is a detail section taken on lines 2a—2a of Fig. 2.

The card feeding mechanism shown in Fig. 2 is exactly similar to that shown and described in Patent No. 1,976,617, issued to C. D. Lake et al. on October 9, 1934, except that provision is made in the form of a clutching device for interrupting the card feeding operations without stopping the accumulating drive mechanism. The analyzing brushes are indicated at UB and LB and the record cards R are successively advanced by picker 9 to pairs of feed rollers 10, which serve to advance the cards past the upper and lower brushes in succession. The shafts upon which rollers 10 are mounted are provided with gears at their extremities and arranged as shown in Fig. 2 for operation by a main driving gear 11 which is freely mounted upon a shaft 8 (Fig. 2a) and which has connection with an arm 15 through a sleeve 7. Arm 15 carries spring-pressed clutching dog 16 normally held in the position shown by an armature latch 17 which is adapted to be controlled by the clutch magnet 18. Between gear 11 and arm 15 are a gear 13 and a clutch driving disk 14 freely rotatable upon the sleeve 7. Gear 13 has gear connection generally designated 12 with the pulley shaft 6 which is in operation as long as the main driving motor is operative. Energization of magnet 18 will trip dog 16 into engagement with disk 14 and the card feeding mechanism will cause cards to be advanced past the brushes UB and LB and feeding operations will continue as long as magnet 18 remains energized. During transferring, multiplying and total taking cycles of operation, magnet 18 is deenergized and card feeding will, of course, not take place during such cycles.

Printing mechanism

Figure 3A:
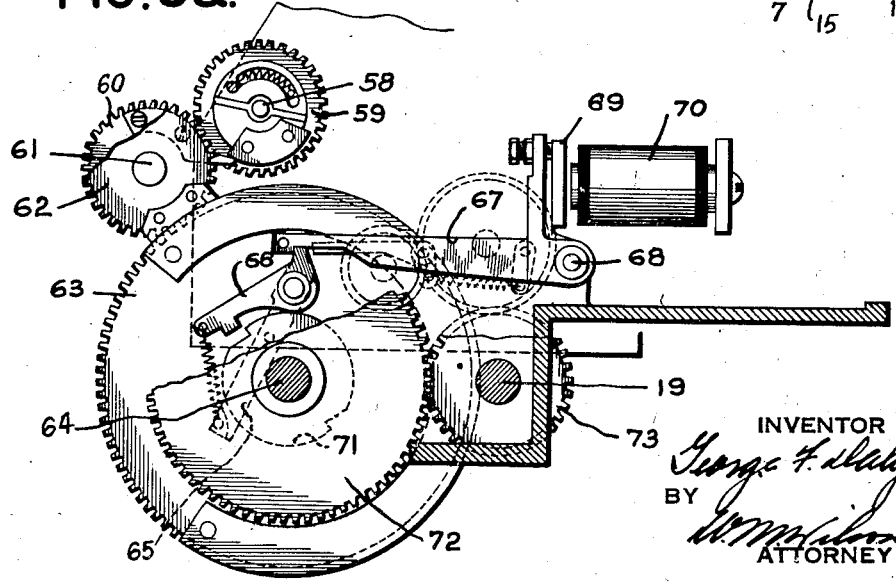
Fig. 3a is a detail of the accumulator resetting mechanism.
Figure 3:
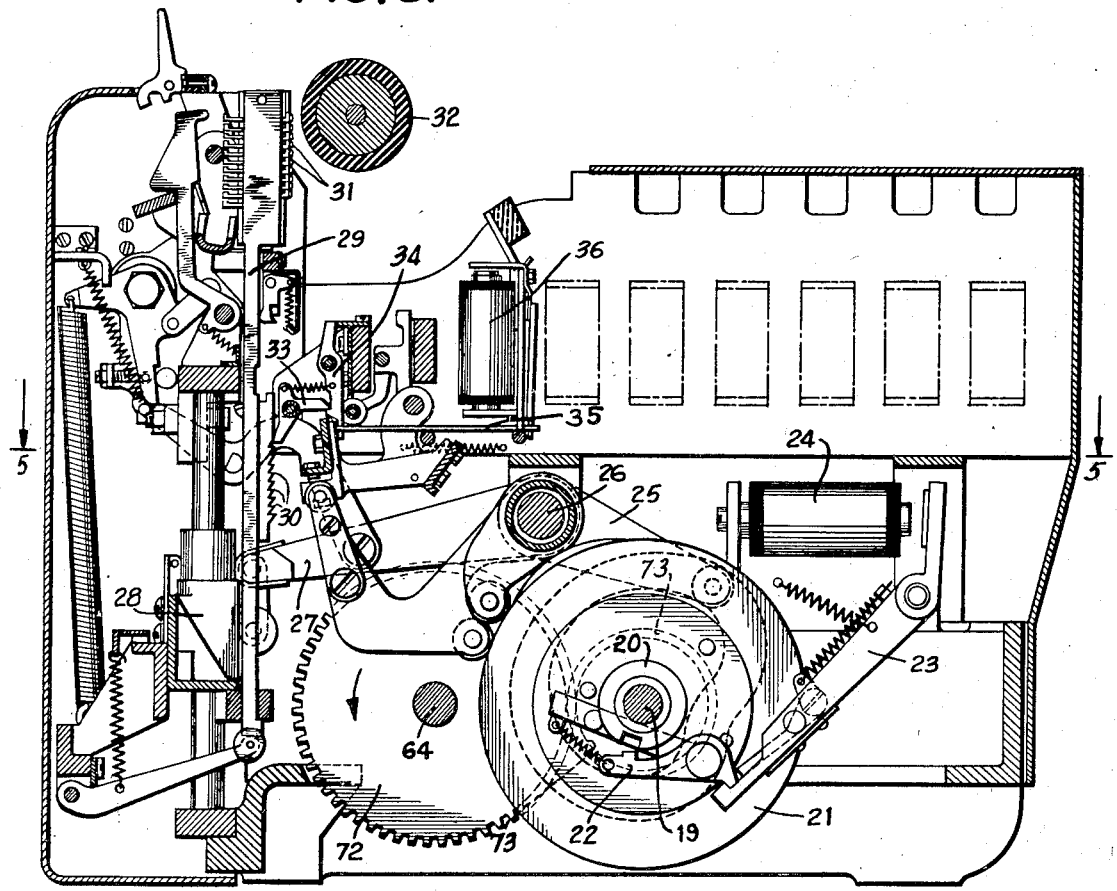
Fig. 3 is a central section of the printing mechanism.
Figure 5:
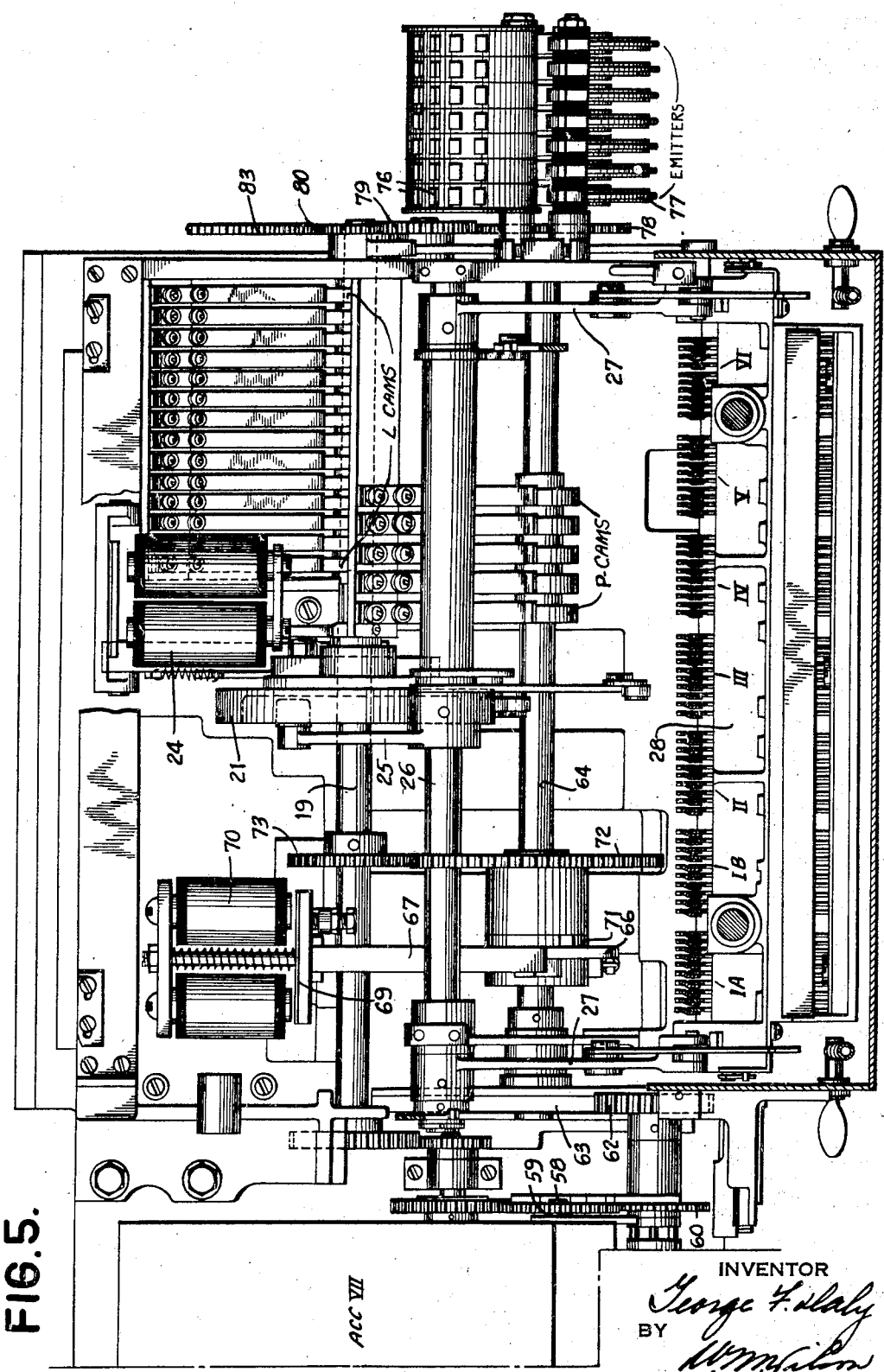
Fig. 5 is a plan section taken along lines 5—5 of Fig. 3.

The printing mechanism is shown in Figs. 3 and 5 where the usual so-called listing shaft 19 carries a clutch driving element 20. Shaft 19 has direct driving connection with the constantly running shaft 6 (Fig. 2), so that clutch driving element 20 may rotate continuously. The listing cam 21 is freely carried on the shaft 19 and provided with a spring-pressed clutching dog 22 adapted for engagement with the driving element 20. Dog 22 is normally held out of engagement by arm 23 controlled by magnet 24. Energization of magnet 24 will permit cam 21 to rotate with the listing shaft 19, and follower arm 25 will cause oscillation of rocker shaft 26 to which are secured arms 27 link-connected to the reciprocating crosshead 28, so that for each revolution of cams 21 crosshead 28 will be moved upwardly and then down again to its initial position. Slidingly mounted on the crosshead are type bars 29 spring urged into movement with the crosshead as it rises. As type bar 29 moves upwardly, ratchet teeth 30 successively pass the nose of stopping pawl 33 as the type elements 31 successively pass printing position opposite platen 32. Energization of printing magnet 36 as the type bar moves upwardly will draw wire 35 toward the right to rock latch 34 out of engagement with stopping pawl 33, whereby the nose of the latter will engage one of the teeth 30 and interrupt further upward movement of the type bar. The upward movement of the type bar is synchronized with the movement of the record card past the analyzing brushes, and if the machine is set for "listing," a perforation sensed by the brushes will energize the magnet 36 to interrupt the type bar with the type element 31 corresponding to the value of the digit represented by the analyzed perforation in printing position. Before the crosshead 28 moves downwardly, the usual printing hammers are tripped to take an impression from the selected type elements. Cam 21 controls the movement of the crosshead 28 during both listing and total taking operations.

Accumulating mechanism

Figure 6:
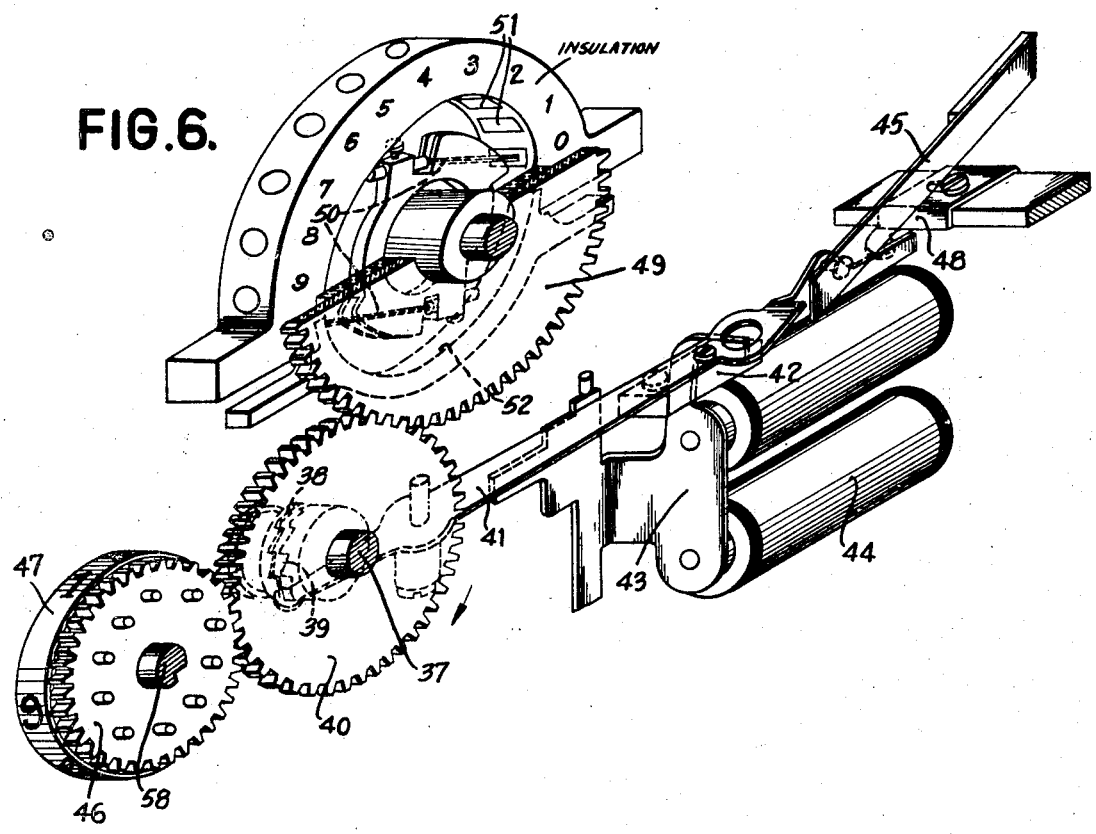
Fig. 6 is an isometric of one order of an adding accumulator.

The adding mechanism is entirely similar to that shown and described in the patents referred to, and the description thereof will accordingly be limited to a brief explanation of its manner of operation. The drive shaft 37 (Fig. 6) is directly geared to pulley shaft 6 of Fig. 2, so that it is in operation as long as the driving motor of the machine functions and the driving ratio is such that shaft 37 makes one revolution for each card feeding cycle of the machine. Shaft 37 has slidably mounted thereon but keyed for rotation therewith a clutch element 38, one for each denominational order of the accumulator. The element 38 is provided with a groove in which fits the end of the short arm of the lever 41, which is pivoted as shown and provided with a block 42 normally held as in Fig. 6 by armature latch 43 of adding magnet 44. A leaf spring 45 bears against the extremity of the longer arm of lever 41 and moves the same in counterclockwise direction upon release of block 42 by armature 43. This movement will bring clutching member 38 into engagement with cooperating teeth 39 integral with a gear 40 loosely mounted on shaft 37. Gear 40, when thus coupled to shaft 37, will rotate a gear 46 which meshes therewith and will displace the accumulator index wheel 47. The rearward extremity of lever 41 is adapted to be engaged by a finger 48 toward the end of the cycle for the purpose of disengaging clutch element 38 from teeth 39 and relatching block 42 on armature 43.

Briefly summarizing the adding operation, the magnet 44 may be energized at various points in the cycle of the machine, depending upon the location of a perforation in a column of the record card analyzed by the lower brushes LB. This energization may take place in response to a perforation in any of the index point positions from 9 to 1, inclusive. A perforation in the 9 index point position will trip the clutch element 38 nine steps before finger 48 is operated to declutch it, and a perforation in the 1 index point position will trip the clutch element 38 one step before it is declutched by the finger 48. Each step of clutching engagement corresponds to a tenth of a revolution of the accumulator index wheel 47, so that a "9" hole will move it nine-tenths of a revolution and a "1" hole will move it one-tenth of a revolution. The manner in which circuits through the lower brushes control the operation of magnet 44 will be set forth in connection with the explanation of the circuit diagram.

Readout mechanism

Also driven by gear 40 (Fig. 6) is a gear 49. Since the ratio of gears 49 and 40 is 2:1, the former will turn through a half revolution for each revolution of the latter. Carried by and insulated from gear 49 is a pair of electrically connected brushes 50, one of which cooperates successively with ten conducting segments 51 while the other cooperates with an arcuate conducting strip 52. The relationship of the parts is such that, when the index wheel 47 is in its zero position, one of the brushes 50 is in contact with the zero segment 51 and the other brush is in contact with the strip 52, thus forming an electrical connection between the two.

If the wheel 48 is displaced to indicate, say, 8, then one of the brushes 50 will be in contact with the "8" segment 51 and the other brush will be in contact with the arcuate strip 52. The positioning of the brushes 50 provides a convenient electrical readout mechanism for controlling total transferring and total printing operations, and the electrical circuits involved in these functions will be more fully explained in connection with the circuit diagram. In certain of the accumulators the wheels 49 are provided with two sets of brushes 50, one set on each side of the wheel to provide a multiple readout setting of the amount standing in the accumulator. Such multiple readout devices are well known.

*Elusive one*

Figure 6A:
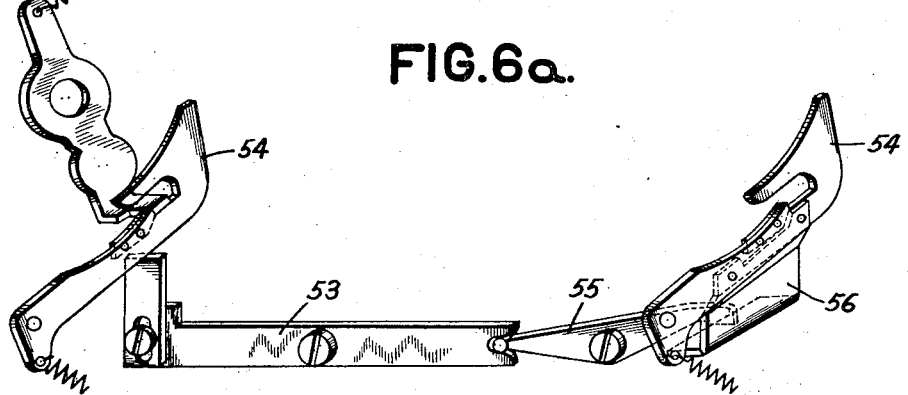
Fig. 6a is a detail of "fugitive one" entering means in the subtracting accumulators.

During certain subtracting operations, it is necessary to add the so-called "fugitive or elusive one" into the units order of an accumulator. For this purpose the accumulators IB and IV are provided with the device shown in Fig. 6a which is the same as fully shown and explained in Patent No. 2,131,226, granted to U. W. M. Kolm on September 27, 1938. Briefly, when the highest order wheel of an accumulator passes from 9 to 0, the lower order wheel will have an additional unit added therein. The mechanism comprises a lever 53 having its left hand arm disposed in the path of the well known carry lever 54 in the highest order. The opposite end of lever 53 has connection with an arm of a pivoted member 55, which member engages an angle 56 secured to the units order carry lever 54 so that, when the highest order lever 54 is rocked, due to passage of its wheel from 9 to 0, linkage 53, 55 will cause the lowest order lever 54 to rock in the same direction. Tripping of the latter lever 54 will result in a carry of 1 into the units order wheel in the well known manner.

*Accumulator resetting mechanism*

The shaft 58 (Fig. 6) upon which the index wheels 47 of an accumulator are loosely mounted is slotted for cooperation with spring pressed pawls (not shown) pivoted upon and carried by the individual index wheels, in such manner that counterclockwise rotation of shaft 58 will engage and drive the index wheels 47 forwardly to zero position during a single revolution of shaft 58.

Referring to Fig. 3a, shaft 58 carries a gear 59 at its extremity which is in engagement with gear 60 mounted upon reset shaft 61. Gear 60, of which there is one for each accumulator, may be selectively coupled to the resetting shaft 61 in the well known manner more fully explained in Patent No. 1,976,617 above referred to. At the extremity of shaft 61 is a gear 62 (see also Fig. 5) which is adapted to be driven by an intermittent gear 63 which is secured to shaft 64. Also fixed to shaft 64 is an arm 65 which carries spring pressed clutch dog 66 normally held in the position shown in Fig. 3a by a latching arm 67 supported by armature shaft 68 of magnet armature 69. Energization of magnet 70 will release dog 66 for engagement with clutch driving element 71. Element 71 is integral with a gear 72 which meshes with a gear 73 secured upon constantly running shaft 19. With this arrangement, drive element 71 is in constant rotation and, whenever it is desired to effect resetting of the accumulators, magnet 70 is energized to provide a connection between the element 71 and the resetting shaft 61. In the present machine, instead of a 1:1 ratio between gears 72 and 73, as in Patent No. 2,126,621, the ratio is such that gear 73 makes two revolutions for one revolution of gear 72. The period during which shaft 64 rotates is called a total taking cycle or total and reset cycle comprising two machine cycles. During the first of the two cycles, printing operations occur and during the second, resetting occurs.

The operation of the accumulator thus far is the same for all eight accumulators.

*Subtracting mechanism*

For the purposes of the present invention, accumulators IB and IV are provided with subtracting mechanism of well known construction, whereby entries may be made in the form of nines complements. Such mechanism is fully shown and described in Patent No. 1,976,617, and one order thereof may be briefly explained in connection with Fig. 7. In the operation of the present subtracting accumulator, the entry of the nine complement of a number to be subtracted is effected by initially tripping all the adding magnets 44 as though to add "nine" in each position and causing the perforation in the record card to declutch the adding mechanism in accordance with the location of the perforation. This will result in the addition of the nine complement of the number.

Secured to shaft 116 are a plurality of clutch elements 117, one for each denominational order position of the accumulator, and cooperating with each element is a clutching dog 118 pivoted at 119 to a cam 120 freely mounted on shaft 116. Also freely mounted on the shaft is a triple-armed member 121, one of whose arms engages a pin 122 in the free end of dog 118 to hold the latter out of engagement with the driving element 117. Each of the arms of member 121 is adapted to cooperate in turn with a pawl 123 which is carried by clutch element 124 pivoted at 125. The pawl 123 is resiliently mounted on element 124 through spring and pin connection 126. A magnet armature 127 is pivoted at 128 and has a pin 129 in a laterally extending arm thereof which is adapted, upon energization of subtracting magnet 130, to rock element 124 in a clockwise direction to release member 121, thereby permitting spring 131 to rock the element in a counterclockwise direction through pin 122 and at the same time permit the engagement of dog 118 with the driving element 117. The cam 120 will thus be driven in a counterclockwise direction until the next arm of member 121 is engaged by pawl 123, which then causes disengagement of the clutch and interruption of further movement of the cam. The cam 120 is provided with three notches 132 about its periphery, into which a roller 133 rises, successively.

Upon the initial movement of cam 120, the higher concentric portion of cam 120 will depress roller 133 and with it, slider 134 upon which the roller is pivoted. A pin 135a extending axially from roller 133 engages a horizontal arm of element 124 to cause the positive restoration of clutch pawl 123 and armature 127 immediately after the clutching action. Slider 134 (see also Fig. 7a) has adjustably connected thereto a slider 135 which is vertically positionable with respect to slider 134, as by pin and slot connection 136. The lower extremity of slider 135 is provided with a notch into which the horizontal arm of a bell crank 137 is fitted. The bell crank is pivoted at 138 and its depending arm lies adjacent to an edge of the clutch arm 41, so that the downward movement of slider 135 will cause the bell crank 137 to engage and move arm 41 in a declutching direction at a time determined by the time of energization of magnet 130, which is controlled by circuits extending through the lower brushes.

It is desirable at the time of declutching of the adding mechanism to cause the positive restoration of the armature 43 of magnet 44 which ordinarily would not be positively restored until the end of the cycle. This is effected through an arm 139 pivoted at 140 and having connection with the slider 134 through a stud 141. Arm 139 carries a spring-pressed pivoted finger 142 whose downwardly extending portion is adapted to engage the armature 43 and move it away from its magnet 44. A spring 143 is provided to move arm 139 and incidentally slider 134 upwardly after they have been depressed. Arm 139 is also provided with an offset finger 144 which engages a horizontally slidable rod 145 whose opposite end is connected through a pin to a finger 146 pivoted at 147. The free end of finger 146 lies in the path of pins 97 and finger 146 will be moved into cooperation with one of the pins 97 at the time that declutching is effected, as just described. This will prevent overthrowing of the index wheel 47 which might otherwise take place due to the high speed at which this mechanism is operated.

In Fig. 7, the shaft 116 has driving connection through usual gearing (not shown) with shaft 37 such that shaft 116 makes two revolutions for one revolution of shaft 37.

Circuit controlling devices

Carried by a stud 74 (Figs. 4 and 5) coaxial with shaft 64 is a pair of electrically connected brushes 75, one of which contacts with conducting segments 76 while the other wipes over a common arcuate conducting strip 77. The brushes 75 are carried by a gear 78 driven through an idler 79 from a gear 80 carried by constantly running shaft 19, and the timing is such that a brush 75 successively contacts with each of the segments 76 as a corresponding type element 31 of Fig. 3 approaches printing position opposite platen 32. These contact devices, of which several are provided, are generally known as emitters and control the transferring, multiplying and total printing circuits in a manner to be more fully explained hereinafter.

In Fig. 5 are shown a plurality of cam controlled contacts whose operation is controlled by cams carried by shaft 64. These contacts are prefixed P to indicate that they function only during total taking and resetting operations. Similar cam controlled contact devices prefixed with the letter "L" are carried by or may be driven from the shaft 19, and these devices are in constant operation as long as the driving motor functions.

In Fig. 2 is shown a shaft 81 which is driven from the gears of the card feeding mechanism and rotates only when cards are being advanced. Controlled by suitable cams on shaft 81 are contacts, each of which is designated by the letter "F," indicating that they are associated with the feeding mechanism and operative only when the feeding mechanism functions.

Figure 4:
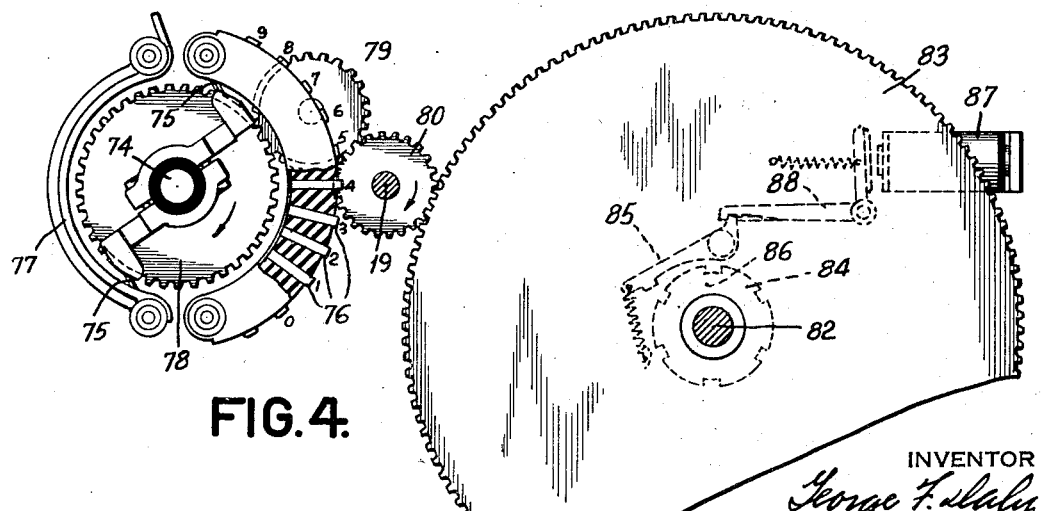
Fig. 4 is a detail of the emitter and multiplying cam shafts and controls therefor.

In Fig. 4 is shown a shaft 82 upon which is freely mounted a gear 83 on constantly running shaft 19. The ratio is such that gear 80 makes six revolutions for one of gear 83. Secured to gear 83 is a clutch driving ratchet 84 in the plane of which lies a dog 85 secured to an arm 86 fast on shaft 82. Energization of a magnet 87 will attract its armature latch 88 to release dog 85 for engagement with ratchet 84, whereupon shaft 82 will rotate with gear 83. On this shaft 82 are located a number of cams for controlling contacts generally prefixed M to denote that they function during multiplying operations.

In Fig. 7b are shown the three index wheels 47 of accumulator 1B. Secured to each wheel is a metallic disk 106 insulated from the wheel and having a segment of insulation 107 which traverses a pair of brushes 108. These segments are so located that, when the accumulator reads 001, the upper wire shown is not electrically connected to the lower wire, and for any other setting of the accumulator wheels there is a circuit through one or more of the brushes 108 connecting the upper and lower wires.

Multicontact relays

Constantly running shaft 19 through suitable 1:1 gearing drives a shaft 89 (Fig. 14) upon which is secured a cam 90 cooperating with a bell crank follower member 91 to slidably shift a serrated operating bar 92 for the multicontact relay devices. The relays are of the mechanically positioned and restored electromagnetically controlled type.

Suitable side frame plates in the frame of the machine are slotted to receive a number of vertical plates 93 (Figs. 13 and 14). Carried on each plate is a magnet which will be designated 1X, 2X, and 3X, etc., and these are used for multiplier selection purposes. These magnets X when energized, serve to control the establishment of circuits at the multicontacts of the relay. The magnets are used as trip magnets only and the armatures of these magnets do not actually shift their related contacts.

As previously explained, the cam 90 shifts its follower 91 and transversely shifts the serrated operating bar 92. Each plate 93, in addition to providing a mounting for the magnets X, also affords a counting for contacts which will be generally designated 94 and 95. Contacts 95 at their upper ends have fastened thereto a strip of insulating material 96, which strip in turn has secured to it an L-shaped member 98. The member 98 has an upper portion which engages into the downwardly extending serrated notches of the bar 92. Member 98 also has downwardly depending from it and affixed thereto a bracket 99 which in turn has pivotally mounted on it a latch member 100. This latch member has slight limited rocking movement between limiting stop pins and is normally urged clockwise by the spring 101. The lower end of the pivoted latch member 100 cooperates with the latch piece 102 fixed to the pivotally mounted armature 103. 103 also has an upwardly extending tail portion 104 arranged in cooperative relation with the restoring abutment 105, carried upon and depending from the serrated operating bar. With the parts in the position shown in Fig. 14, the cam 90 has shifted the serrated operating bar 92 to a position in which the contacts 94 and 95 are kept open and to the position in which the strain is removed between the latch 100 and the latch point 102 of the armature assemblage. The relay magnet X may now be energized and upon being energized, the latch portion 102 will be lowered, allowing the latch 100 to trip over the top of the latch point. Thereafter, upon further rotative movement of the cam 90, the serrated operating bar 62 moves to the left and allows contacts 95 to close under their own spring action and establish contact with contacts 94. After a set of multi-contacts has been tripped in the above manner, the operating cycle of the machine ensues and subsequently the cam 90 again shifts its follower to cause the operating bar to take a movement of somewhat larger extent to the right and cause the armature knockoff bracket 105 to intercept 104 and knock off any previously attracted armature. Subsequent movement of the cam allows the serrated operating bar to move back to the position shown in Fig. 14. If any particular magnet is energized, its corresponding armature will not be attracted and the latch member 102 will then prevent a closure of contacts 94 and 95.

General explanation of the circuit diagram

The wiring diagram of the electric circuits is shown in Figs. 12a to 12f wherein the various cam controlled contact devices are diagrammatically shown and suitably labeled F, L, M, or P, for identification as explained. The timing of these contact devices is shown on the timing diagrams (Figs 10, 10a, 11, and 11a) to which reference may be made for the actual time in the cycle of operation during which they function. In Figs. 10, 10a, 11, and 11a the darkened portions represent the period during which the cam contacts are closed.

Due to the numerous interlocking relays employed in the present arrangement, it has not been advisable in all instances to show relay magnets and their associated contacts in close proximity to one another. For purposes of clarity in the wiring arrangement, the relay contact points are shown in the circuits which they control and their relay magnets are dotted adjacent thereto. Further than this, the contacts are designated with the same reference character as the controlling magnet, followed by a lower case letter.

Problem

Figures 8, 8A:
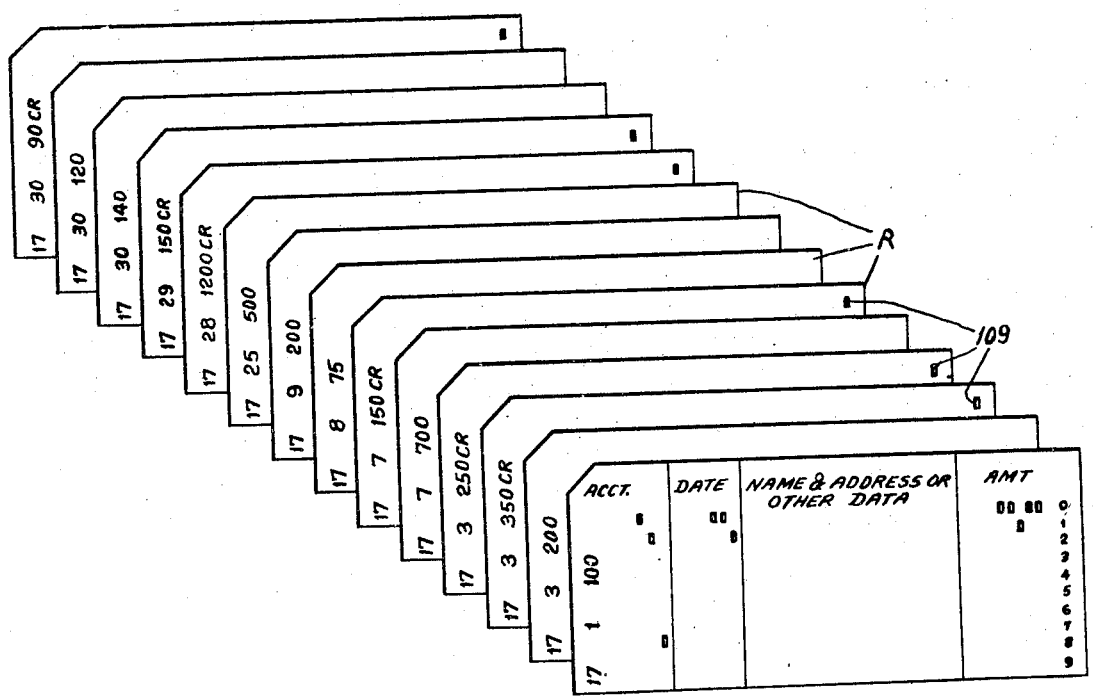
Fig. 8 is a group of cards showing their prearrangement before feeding through the machine.
Fig. 8a is a printed form prepared by the machine.

A representative set of cards for controlling the operation of the machine is shown in Fig. 8 where the cards R are each perforated with the same account number 17 in the left hand field and with a date number in the next field. Amount representing perforations are made in the right hand field where also a special well known "X" hole may be made as indicated at 109 where the amount is a credit transaction. This group of cards represents a customer's transactions with the bank during an accounting period, and there is present a card for each day upon which a debit or credit transaction occurred. Where several transactions occurred on any day, there will be a number of cards for that day. Each card will bear account number designations (generally designated major control number) and an interest date number. The interest date numbers may run consecutively from No. 1 and may cover an interest period of any number of days; e. g., if the interest period be the months January, February, and March, January 1 might be designated as date No. 1; January 2 as date No. 2; February 1 as date No. 32, etc. March 31 in a normal year would be designated as date No. 90. Similarly, if the interest period to be covered were an entire year, the December 31 date might be No. 365 in a normal year.

It is the practice in some banks to bill borrowers from the bank or to credit depositors of the bank with interest up to but not through the last day of an interest period, i. e., a bank might elect to pay or charge interest for the months of October, November and December and to bill or credit each account with the interest due or payable on December 31, although the bill or credit memo might bear a date of January 1. The type of machine described herein may be used in such cases by providing suitable date numbers; e. g., in this case December 31 would be designated date No. 1, etc. Any old balance remaining at the close of an interest period will be treated in the same manner as if it were a transaction of the entire amount bearing the first date. It is customary in some cases to punch a new balance card at the close of an interest period, which balance is to be utilized in connection with computing interest for the succeeding interest period. In such a case an old balance would bear a date No. 1.

Fig. 8a represents a report prepared by the machine in which there is a printed line for each transaction day. The column headings IA, IB, II, III, IV, V, and VI denote the accumulators which control the values printed on the several lines, and these headings also denote the related sections of the printing mechanism that perform the actual printing. To the right is designated accumulator VII which has no related printing section, and the dotted numerals represent the products obtained in the accumulator.

In the preparation of this form, no items are printed directly from the cards. The amounts are entered into the accumulators and during a total printing and transferring operation, printing takes place. A better understanding of the sequence of events may be had by considering Fig. 8a in conjunction with Fig. 9 where by means of a so-called "flow" diagram the relationship of the various units is indicated.

It may first be pointed out that the cards are arranged in the order shown in Fig. 8 with date numbers constituting "minor" groups and the account numbers constituting a "major" group. Assuming that all accumulators have been cleared and that the machine has been plugged and the switches have been adjusted as will be specifically explained later in connection with the circuit diagram, the general operation is as follows.

After preliminary operations have been performed to feed the first card to a position where it is in readiness to pass the lower brushes, card feeding takes place with the second card passing the brushes UB, while the first card concurrently passes brushes LB. Under control of brushes LB, the account number 17 and date 1 on the first card will be additively entered into accumulator IA through connections designated by line 151 which include the so-called "group indicating device" designated GI which functions to permit the group number to be entered from only the first card of each minor group.

The date 1 is also entered into accumulator IB from the first card through connections designated by line 152 which also includes a group indicating device GI. This entry is made subtractively, i. e., as the complement 998 of the number 1 sensed. At the same time the date 3 of the second card is entered from brushes UB into the "Date relays." The "Date relays" receive the date from every card as it passes the brushes UB and is cleared immediately, providing the group control device GC indicates that the cards passing the brushes UB and LB bear the same date. When the group control device indicates a change in date, the date of the following minor group will have been sensed and entered and this number will be retained on the "Date relays." Thus, for the problem of Fig. 8, when the date 3 is entered it is retained, since the group control device will indicate a minor change at this time between dates 1 and 3.

As the first card passes brushes LB, the amount 100 is also sensed and entered into accumulators II and IV additively through connections designated by lines 153. If the amount were a "credit," the presence of the special "X" perforation 109 sensed previously by brushes UB would have adjusted switches or contacts to direct the amount additively into accumulator III and negatively into accumulator IV through connections designated 154.

The group number change between the first and second cards causes interruption of card feeding and initiation of a "Date transfer cycle" of operations during which the number 3, which has been set on the date relays, is transferred through connections represented by line 155, to accumulator IB, additively. As a result, the 3 added to 998 already in accumulator IB will cause the true difference of 2 to appear on wheels of accumulator IB. (It is to be noted that the "fugitive one" is entered by the device of Fig. 6a.)

The balance of 100 standing in accumulator IV is now to be multiplied by this difference of 2. Such multiplication involves connections 156 from the readout of accumulator IB to the "MP relays," connections 157 including "MP emitter," the "MP relays," the readout of accumulator IV and "Partial products" devices to form the product 100×2 in accumulator VII.

The presence of a difference greater than 1 in accumulator IB causes shifting of contacts identified "Multiples," so that after the product 200 is obtained in accumulator VII it is transferred from the readout of accumulator VII, through connections 158, "Multiples" contacts, and connection 159 to accumulator V, through contacts labeled "Bal." If the balance 100 in accumulator IV had been negative or credit, contacts "Bal" would be in shifted position for this operation, and the product would have been entered from the readout of accumulator VII, through connection 160 into credit balance accumulator VI.

During this transfer operation, printing on the first line of Fig. 8 occurs from accumulators IA, IB, II and IV, through circuit connections 161 to 164 respectively, the designation "MI" in each connection indicating these connections are the result of a minor group change. Printing also takes place in column V concurrently with the transfer from the products accumulator VII, through connections 158, branching through connection 165. Here again, if the balance in accumulator IV were negative, the printing would take place in column VI, through connection 158, branching at contacts "Bal" to connection 166 leading to column VI.

Following this total printing operation, accumulators IA, IB, II, III, and VII are reset and card feeding resumes with data from cards of date 3 being entered into accumulators II, III and IV. Upon the next minor group change number 3 will stand as its complement 996 in accumulator IB and number 7 will stand in the date relays. In the following date transfer operation, accumulator IB will stand at 4. The balance in accumulator IV at this time is 300 which is to be multiplied by 4 and the product 1200 obtained in accumulator VII from which it is transferred to accumulator VI. Finally, printing is effected on the second line of Fig. 8 of the amounts indicated.

Following printing, accumulators IA, IB, II, III, and VII are cleared and card feeding resumes with the first card of the date 7 passing the lower brushes LB and entering this number as 992 into accumulator IB. As the last card of group 7 passes LB, the first card of the next group of date 8 passes UB, so that upon the interruption of card feeding resulting from the group number change and the succeeding date transfer operation, accumulator IB will register 001. This is an indication that the new group of cards, which has not yet been sensed by the lower brushes, bears a date of the next consecutive number after the date of the cards that have just been sensed by the lower brushes. Under these conditions, no multiplying operations take place and the balance 250 now standing in accumulator IV is to be entered into accumulator V only once. This is effected by a direct transfer from accumulator IV to accumulator V through the connection represented by lines 167 and 159 in Fig. 9. If the amount in accumulator IV were negative, the transfer would be to accumulator VI through connection 167, contacts "Bal" and connection 160.

When there is a difference in dates of only one unit represented in accumulator IB, the multiplying operations are eliminated and the transfer from accumulator IV to either V or VI takes place immediately following the "Date transfer" operation.

The above procedure repeats for each day number group with transfer or multiplying depending on whether the difference sensed is 1 or more and with the entries made in the accumulators selectively in accordance with debit or credit characteristics of the amounts.

*Account number change.*—When the last card of a group having the same account number passes the brushes LB, the first card of a new account number group or no card will be passing the brushes UB. As before, the date of the first card of the new group enters the "Date relays" but is of no effect because, as a result of the detection of this major group change, contacts identified as "Major shift" (Fig. 9) disconnect the date relays from accumulator IB and connect a device designated "Dials" thereto. Comparison upon a major change cannot be made with a date number in the succeeding card, since this represents a date of a different account. Comparison is desired with the date number of the end of the interest period or, in some cases, with the date number one digit higher in value than the end number.

A group of manually settable dial switches is provided in the machine, and these are positioned and remain set during the entire operation of the machine on groups of cards representing any number of accounts. In the example of Fig. 8, the dials would have been set at 32, i. e., one digit higher than a 31-day month.

Upon the major group change, card feeding stops and the date transfer operation takes place with the date 32 being entered into accumulator IB, where the value 969 (complement of 30) now stands, to obtain the difference 2. The multiplying operations now take place to obtain the product 310 in accumulator VII which is then transferred to accumulator VI. Upon a major change two total printing and resetting operations take place, during the first of which transfer from accumulator VII to accumulator VI takes place, printing takes place from accumulators IA, IB, II, III, IV and VII and accumulators IA, IB, II, III, IV, and VII are reset. During the second total printing and resetting operation, the amounts 12,250 and 2010 are printed from accumulators V and VI and these accumulators are reset. The later printing circuits are through connections represented by lines 168 in Fig. 9.

Circuit diagram

The detailed explanation of the various circuits for handling the problem of Fig. 8 will now be explained in connection with the circuit diagram (Figs. 12a to 12f).

*Initial reset cycle.*—Current for the machine is provided by a generator G driven from a suitable source (not shown), which generator is connected to one side of a line 170 and to ground through a line 171 (Fig. 12a). In the lower part of Fig. 12a is shown the group control mechanism, generally designated GC, and as is usual in tabulating machines it is first necessary to set up the major and minor holding relays MI and MA before the machine can be started. This is effected by depression of the reset key to close contacts 193, and hold them closed for four machine cycles, thereby completing a circuit from right side of line 170, wire 195, contacts 193, relay contacts R1a, R2a, relay magnets R3, R4 to grounded line 171. Energization of magnet R4 will close its contacts R4a in the upper part of Fig. 12a which will thereupon complete a circuit from right side of line 170, wire 195, stop key contacts ST, contacts R4a, relay magnet R5, contacts 172, main drive clutch magnet 173 to line 171. Energization of magnet 173 will cause coupling of the driving motor TM to the pulley shaft 6, mentioned above, and will, incidentally, cause opening of contacts 172 whereupon relay magnet R6 will be included in the series circuit through magnet 173 and will close its contacts R6a to complete the circuit through the driving motor TM. Contacts R5a provide a holding circuit which is traceable from the contacts through cam contacts L1 and wire 195 to line 170. Cam contacts L1 open toward the end of each cycle and at such time the circuit through magnet R5 is maintained through either contacts R4a, UCLa or contacts LCLa which are in series with list control contacts LCa. At this time however, the contacts UCLa and LCLa are open so that the machine stops after the total and reset cycle upon release of contacts 193.

The manner in which one or more of these contacts LCLa and UCLa in the holding circuit may be opened to interrupt the same will be explained hereinafter.

The relay magnet R4, energized by depression of the reset key will close a second pair of contact points R4b for completing a circuit from line 170, wire 195, cam contacts L2, contacts R4b, reset magnet 70, to line 171 and ground.

As explained in the mechanical description, energization of magnet 70 will effect resetting of the accumulators and will cause a cycle of operation (two machine cycles) of the P cam contacts of which contacts P3 (the lower part of Fig. 12a) close to set up the minor control circuit, continued closure of contacts 193 will cause a second cycle of operation of the P contacts, and contacts P2 will operate to set up the major control circuit.

The circuit set up during the first reset cycle is traceable from line 171, contacts P2, magnet MA, contacts F2, wire 176 to line 170. Magnet MA closes its contacts MAa to establish a holding circuit. The reset key is held for two reset operations and during the second cycle minor relay magnet MI is energized through a circuit from line 171, contacts MAa, contacts P3, magnet MI, magnets R7, R8, contacts F3, F2, wire 176 to line 170.

During each card feeding cycle, contacts F2 and F3 open momentarily as indicated in Fig. 10. If the device is plug connected for control by the perforated fields of successive cards, there will be a shunt circuit completed to maintain the magnets energized. If the holes sensed disagree, there will be no shunt circuit and the magnets will become deenergized.

Toward the end of these reset cycles, cam contacts L2 breaks, as indicated in the timing diagram, and with contacts 193 now open the machine will coast through the remainder of the cycle to home position, which will hereinafter be termed the D position, as it is commonly known in the art.

*Starting circuit.*—With the group control set up, that is, with magnets MA, MI, R7 and R8 energized, and the accumulators cleared, the machine is in readiness to feed cards and analyze the data thereon. When contacts P1 close near the end of the initial reset cycles, a circuit will be completed from line 170, wire 195, contacts P1, R2c, R1m, contacts LCb, relay magnet R10 to line 171. The contact points R10a are in parallel with the contacts R4a and will in the same manner as explained above complete the circuit through the driving clutch magnet 103 and cause operation of the motor TM.

Relay magnet R10 is provided with a second pair of contacts R10b which are adapted on closure to complete a circuit to the card feed clutch control relay magnet R11. This circuit is traceable from line 171, magnet R11, contacts R10b, stop key contacts STa (operable concurrently with the contacts ST), relay contacts R3a, contacts R7b of the minor control relay magnet R7 which are now closed, contacts R2b, R1b, wire 195, to line 170. This circuit, it will be observed, can only be completed when the group control relay magnets are energized. Magnet R11 will close its points R11a to provide a holding circuit for the magnet and a second pair of points R11b wired in series with the feed clutch magnet 18 will energize the latter so that cards may commence to feed.

*Card lever circuits.*—As the cards are advanced past the upper set of analyzing brushes UB, the usual card lever contacts 177 are closed to complete a circuit from line 170, contacts 177, relay magnet R13, magnet UCL, wire 178 to line 171. Magnet UCL controls a number of contacts which are disposed in various circuits for controlling purposes. One of these contacts, for example UCLa pointed out above as being in the holding circuit of the motor drive clutch, will open to interrupt this circuit if cards fail to feed past the upper brushes. Since the card lever contacts 177 open between the successive cards, a holding circuit is provided through contacts R13a and cam contacts L5 which serve to maintain magnet UCL energized during the interval when contacts 177 are open. In a similar manner the lower card lever contacts 179 cause energization of relay magnet R12, and lower card lever relay LCL and the contact points R12a cooperate with cam contacts L6 to provide a similar holding circuit.

*Reset cycle.*—Cards feed from the magazine until the first card is about to pass the lower brushes. At such time the group control functions to deenergize the control magnets MI, R7 and R8. As a result card feeding stops. Closure of upper contacts R7a (Fig. 12a) causes energization of magnets LC and R29, the latter of which causes energization of reset clutch magnet 70 to cause reset cycles as already explained. The control magnets MI, R7 and R8 are again energized and the machine is in readiness to begin entering data from the cards.

*Tabulating cycle.*—As before contacts P1 automatically initiate card feeding and the machine enters upon a cycle during which the first card passes brushes LB, while the second card concurrently passes brushes UB. During this cycle the amount 100 is entered into accumulator II and accumulator IV, the day number 1 is entered as a complement in accumulator IB from brushes LB. At the same time the day number 3 from the record card is entered into the date relays. The entering circuits involved will be traced now. This cycle may be called the first card feed cycle of each minor group and is indicated in the timing chart (Fig. 10). During this cycle, the card lever contacts are closed so that relay magnets LCL and UCL are energized, and they remain so throughout all subsequent operations of the machine.

*Setup of group indicating device.*—During the prior resetting cycle, a circuit was completed traceable in Fig. 12a from line 170, wire 195, contacts LCLb, and P4, through magnet GI to line 171 and to ground. Consequent closure of contacts GIb established a holding circuit through contacts F4, so that magnet GI is energized during the card feed cycle now about to ensue.

*Entering amount 100 in accumulator II.*—As the first card passes brushes LB, entering circuits are completed of which a representative one is traceable from line 170 (Fig. 12a), lower card lever contacts 179, wire 180 (Fig. 12b), circuit breakers 181, contacts F1, perforation in the card, brush LB, plug connection 187 (Fig. 12c), upper relay contacts R18a, connection 188, adding magnet 44 of accumulator II, to ground. Thus, the amount 100 is additively entered into accumulator II.

*Entering amount 100 into accumulator III.*—It may be well to explain at this time how the amount 100 would be entered into accumulator III if the card contained a credit indicating perforation. This credit perforation in the "X" position of a selected column would have been sensed by the upper brushes as the card passed thereby and a circuit would have been completed from line 170 (Fig. 12b), contacts UCLe, F7, X hole in the card, appropriate brush UB, plug connection 184 (Fig. 12c), contacts L18 (closed at "X" sensing time), magnets R16 and R17 in parallel, contacts UCLd to ground. Closure of contacts R17a will hold magnets R16 and R17 energized through contacts F25. A parallel circuit from connection 184 extends through connection 189, contacts L23, magnet R19, contacts UCLd to ground. Closure of contacts R19a and R19b result in energization of magnet R18, through a branch circuit from contacts L23, contacts R19a, R19b, magnet R18 to ground. Magnet R18 closes its contacts R18b to establish a holding circuit through contacts F15 which hold magnets R18 and R19 energized throughout the entering portion of the next cycle. Contacts F25 likewise hold magnets R17 and R16 energized. Therefore, as the card passes brushes LB, contacts R18a (Fig. 12c) are shifted from the position shown so that the entering circuit through connection 187 will be diverged to continue through lower contacts R18a, connection 190 to adding magnet 44 of accumulator III instead of accumulator II.

*Entering amount 100 into accumulator IV.*—During the same cycle, the amount 100 is entered additively into accumulator IV. This accumulator must first, however, be conditioned for addition or subtraction. Considering addition, when contacts F26 (Fig. 12c) close, a circuit is completed from line 170, contacts F26, UCLb, left hand contacts R16a, magnet R15 to ground. Closure of contacts R15b establishes a holding circuit through contacts F27. As a result, magnet R15 is energized and its contacts R15a shifted from the position shown at the bottom of Fig. 12c during the entering part of the cycle. A representative entering circuit is traceable from line 170 (Fig. 12a), contacts 179, wire 180 (Fig. 12b), contacts 181, F1, amount representing perforation, plug connection 182 (Fig. 12c), lower contacts R15a, adding magnet 44 to ground.

If the card contained the credit designation, then as a result of sensing the X hole by brushes UB magnet R16 would have been energized as explained and magnet R14 (Fig. 12c) would have been energized instead of magnet R15. Magnet R14 closes contacts R14c and R14a so that, upon closure of contacts L28 at the "9" time, a circuit is completed from line 170 (Fig. 12a), contacts 179, wire 180 (Fig. 12b), contacts 181, F1, wire 191 (Fig. 12c), contacts L28, contacts R14c, wire 185 and thence in parallel through all the adding magnets 44 of accumulator IV to commence adding 9's in all orders. Upon sensing the amount perforations, circuits will be completed from the lower brushes LB as for adding, to connection 182 (Fig. 12c), diverging through contacts R12a to subtract magnets 130 and ground. As a result, the nines complement of the amount sensed will be entered into accumulator IV.

The foregoing explains that, when the amount is debit or positive, it is entered additively into accumulators II and IV and, when it is credit or negative, it is entered additively into accumulator III and negatively into accumulator IV.

*Entering date 1 negatively into accumulator IB.*—During the cycle in which the first card passes brushes LB, the date on the card is subtractively entered into accumulators IB from the first card of the group. In the present example there is only one card in the group. Upon closure of contacts L28 (Fig. 12c), a circuit is completed at the "9" entering time from line 170 to wire 191 as already traced, contacts L28, wire 192 (Fig. 12b), contacts R1g, in parallel through all upper contacts R1e, adding magnets 44 to ground. As the perforations in the date field are sensed, circuits are completed from line 170 to brushes LB as traced, contacts GIa (now closed), connections 182, 183, upper contacts R1c, contacts R1d, subtract magnets 130 to ground. As a result, the 9's complement of the date is entered into accumulator IB. The contacts GIa open after the first card is sensed, so that if there were further cards of the same date, no entries would be made into accumulator IB.

Figure 12B:
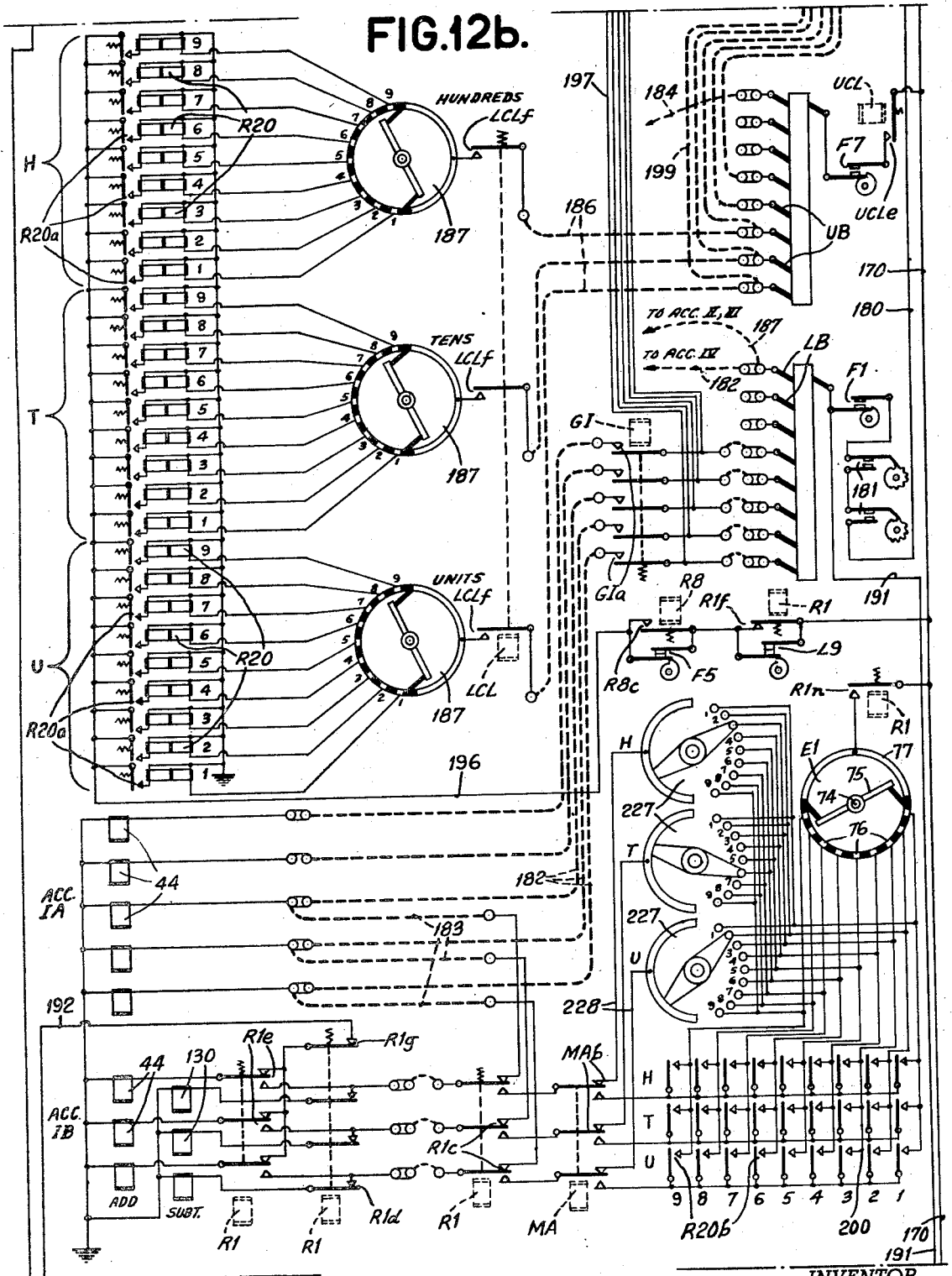

*Entering date 3 into date relays.*—The so-called date relays are shown in Fig. 12b and comprise three sets of nine double wound magnets R20 for the units, tens and hundreds orders of the date. For each set there is provided a distributor 187, whose brush is driven in synchronism with the card feed, so that the magnets in each set are connected in the order 9, 8, 7, etc., to the brushes UB as the correspondingly numbered index point positions of the card are sensed by these brushes. Considering the selected problem, as the first card passes brushes LB, the second card passes brushes UB and in the date field circuits are completed of which the following is representative. From line 170, contacts UCLe, F7, date hole in the card, brush UB, connection 186, contacts LCLf, distributor 187, to the right hand or pickup winding of the magnet R20 corresponding to the value of the hole sensed and thence to ground. Magnet R20 closes its contacts R20a to establish a circuit traceable from line 170, contacts R1f, F5, wire 196, contacts R20a and left hand or holding winding of magnet R20 to ground. This holding circuit is maintained until near the end of the cycle when, if the cards passing the brushes UB and LB are alike in control numbers, contacts F5 open to break the holding circuits. If the numbers are unlike, the circuits are maintained under control of the group control mechanism which will now be explained.

*Group control mechanism.*—As the cards pass the sensing brushes, the group control mechanism functions to detect a change in group number. This device functions substantially as in Patent No. 1,976,617 except for the manner of controlling contacts R21b which are the usual so-called series control contacts. Without entering into detailed explanation, these contacts function to maintain magnets MA, MI, R7 and R8 continuously energized as long as the account and date number of successive cards agree. When a change in date occurs, one of the lower three contacts R21b is open at the so-called testing time when contacts F2 and F3 open, so that magnets MI, R7 and R8 become deenergized but magnet MA remains energized. This condition is called a minor group change. When a change in account number occurs, one of the upper two contacts R21b is open (regardless of the condition of the lower three contacts), so that all the magnets MA, MI, R7 and R8 become deenergized. This condition is called a major group change. The circuits through which contacts R21b are closed may be seen by the tracing of a representative control circuit as follows. From line 170 to the lower brush roller (Fig. 12b) as before, control hole in the units order of the date field for example, wire 197 (Fig. 12a), pickup winding of magnet R21, wire 198 to ground. If the card concurrently passing brushes UB has a hole in the same location, a parallel circuit is traceable from line 170 (Fig. 12b), contacts UCLe, F7, hole in card, connection 199 (Fig. 12a), pickup winding of the companion magnet R22, wire 198 to ground. Magnets R21 and R22, if concurrently energized, close their related contacts R21a and R22a establishing a circuit from line 170, wire 176, left hand winding of magnet R22, contacts R22a, left hand winding of magnet R21, contacts R21a, contacts F12 to ground. Contacts F12 hold the magnets energized and consequently contacts R21b are closed until after the testing time when contacts F2 and F3 open. If all columns compared agree, card feeding continues uninterruptedly.

In the present case where the first card bears date 1 and the second card bears date 3, the related magnets R21 and R22 will not be concurrently energized, so that magnets MI, R7 and R8 are deenergized at the end of the card feed cycle and their related contacts return to the positions shown in the circuit diagram.

*Initiating date transfer operation:*—There now ensues a "date transfer" cycle of operation during which the date 3 is additively entered into accumulator IB. The magnet R7 will open its relay contacts R7b in the feed magnet controlling relay circuit to deenergize relay magnet R11 which in turn will open its contact points R11b to deenergize the feed magnet 18, so that further card feeding operations will be interrupted. Deenergization of magnet R8 under control of the automatic control devices will cause closure of contacts R8a and a circuit will be completed therethrough upon closure of cam contacts L13 during the latter part of the last card cycle which is traceable from line 170, contacts L13, contacts R8a, contacts R23c (now closed due to the fact that magnet R23 is now energized), magnet R1, wire 178 to ground.

Magnet R23 has been preliminarily energized during the card feed cycle when contacts F6 closed through a circuit traceable from line 170, contacts LCLd, F6, magnet R23, wire 178 to ground. This circuit is held through contacts R23a and contacts R24a of a magnet R24. Thus, upon a group change contacts R23c are in closed condition in which they remain until shortly after this cycle has commenced.

Upon the initial energization of magnet R1 a pair of associated contacts R1j will be closed setting up a holding circuit for the magnet traceable from line 170 (Fig. 12a), contacts P5, L11 and R1j, magnet R1, wire 178, to ground. The accompanying closure of a further pair of contacts R1h will also permit completion of a circuit, when cam contacts L14 close, which is traceable from line 170, contacts L14, R1h, magnet R24, wire 178 to ground. Contacts R24b (closed by magnet R24) will provide a holding circuit for the latter which runs through cam contacts P5 so that the magnet R24 will remain energized until total printing operations have been performed. A pair of contacts R24a will be opened upon energization of magnet R24 thereby interrupting the holding circuit through the relay magnet R24 which in turn will now permit opening of its contacts R23c and closure of its contacts R23d.

A pair of contacts R1k is provided in parallel with the lower card lever contacts 179 which are now open since card feeding operations have been interrupted. The function of contacts R1k therefore is to maintain the lower card lever relay magnet LCL energized which in turn keeps the driving motor in operation.

Contacts R1a are open during this cycle to prevent the manual initiation of resetting operations and a further pair of contacts R1m is also open to prevent the automatic restarting of card feeding operations.

*Transferring date from date relays to accumulator IB.*—Referring to the bottom of Fig. 12b, there are shown three sets of contacts R20b, one set for each set of date relays, R20, and these contacts will be set to represent the date 3 by having the appropriate contacts closed. With magnet R1 energized as explained, contacts R1n, R1c, R1d, R1g and R1e will be in shifted position so that, during the rotation of the brush 75 of emitter E1 in this cycle, impulses will be transmitted to the adding magnets 44 of accumulator IB representative of the date set on contacts R20b. The circuit for entering the date 3 is traceable from line 170, contacts R1n, emitter E1, through its "3" segment 76, wire 200, closed contact R20b in the 3 position of the units row, lower contacts MAb (now closed) lower contacts R1c, lower contacts R1e, add magnet 44 to ground. The amount 3 added to 998 already standing in accumulator IB will result in 001, to which a carry from highest to lowest order adds a unit resulting in an ultimate setting of 002 in the accumulator. At the end of this cycle, contacts L11 (Fig. 12a) open to deenergize magnet R1. Also, when contacts L9 (Fig. 12b) open after the entering part of the cycle while contacts R1f are open, the holding circuit for date relay magnets R20 is broken so that this device is cleared at such time.

*Initiation of multiplying cycles.*—The amount 100 now standing in accumulator IV is to be multiplied by the amount 2 standing in accumulator IB. For this purpose the machine now automatically enters upon six cycles of operation which invariably take place whenever the amount in accumulator IB is greater than 1. During these six cycles, the so-called left hand and right hand partial products are formed and entered into accumulator VII in succession. This is brought about as follows: Near the end of the date transfer cycle cam contacts L7 close and, since accumulator IB registers more than 1, a circuit is traceable from line 170, a pair of brushes 108 (Fig. 12a), wire 201, contacts L7, contacts R1p (still closed at this time), magnet R25, wire 178 to ground. Contacts R25a provide a holding circuit through contacts R26b. When contacts L13 close still later in the cycle, a circuit is completed from line 170, contacts L13, R8a, R23d, R25b, multiplying clutch magnet 87 and magnet R2 in parallel, wire 178 to ground. Magnet R2 closes its contacts R2e to energize magnet R26 which in turn closes its contacts R26a to establish a holding circuit through contacts P5. Magnet R26 also opens its contacts R26b to deenergize magnet R25 so that no further energization of this magnet can be had during multiplying cycles. In the same manner as for magnet R1, magnet R2 opens its contacts R2a in the reset circuit, R2c in the auto start circuit and R2b in a to be described reset initiating circuit. It also closes its contacts R2d to provide a holding circuit for itself and the clutch magnet 87 traceable from line 170, cam contacts M8, contacts R2d, magnet 87 and R2, wire 178 to ground.

Figure 12C:
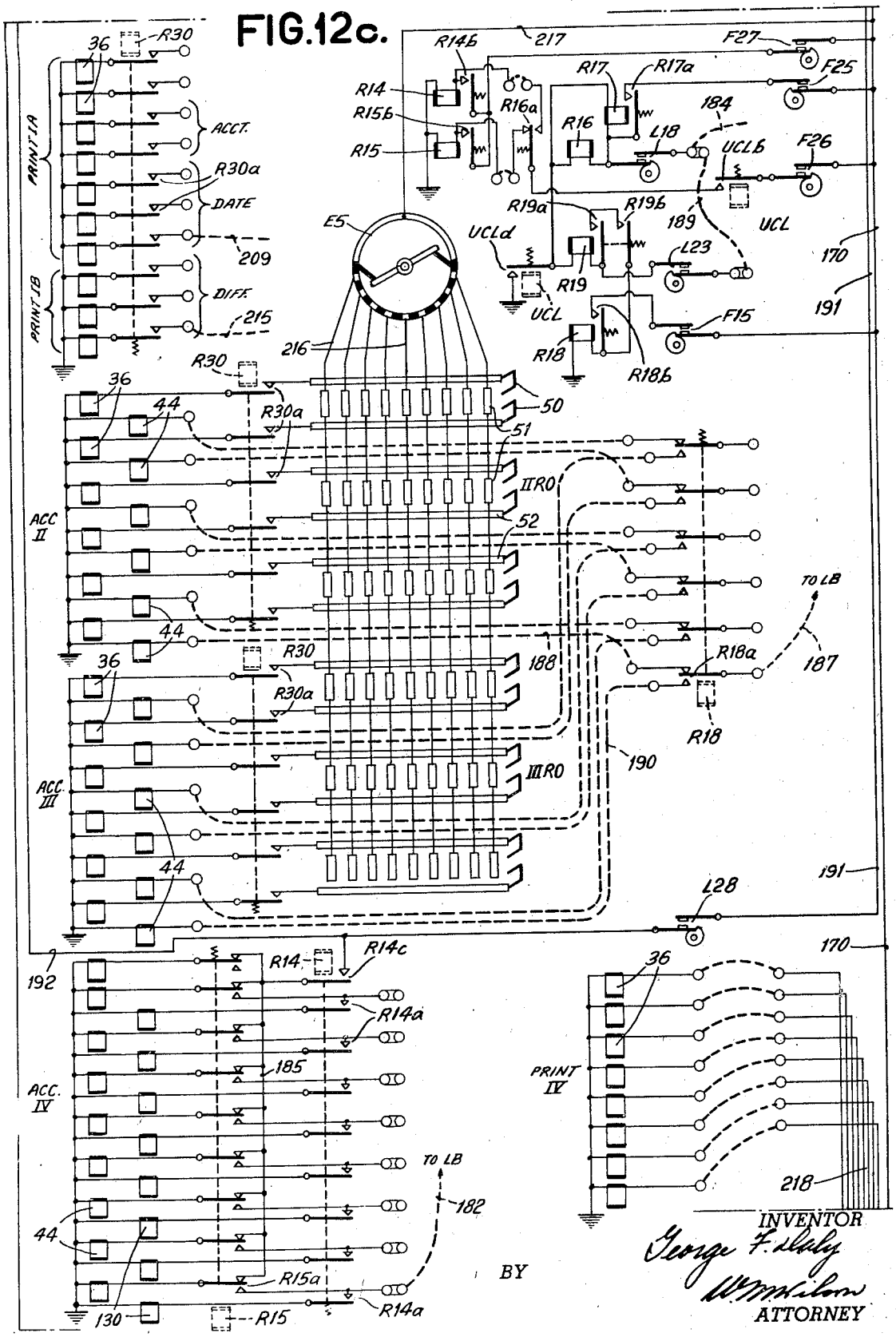
Figure 12D:
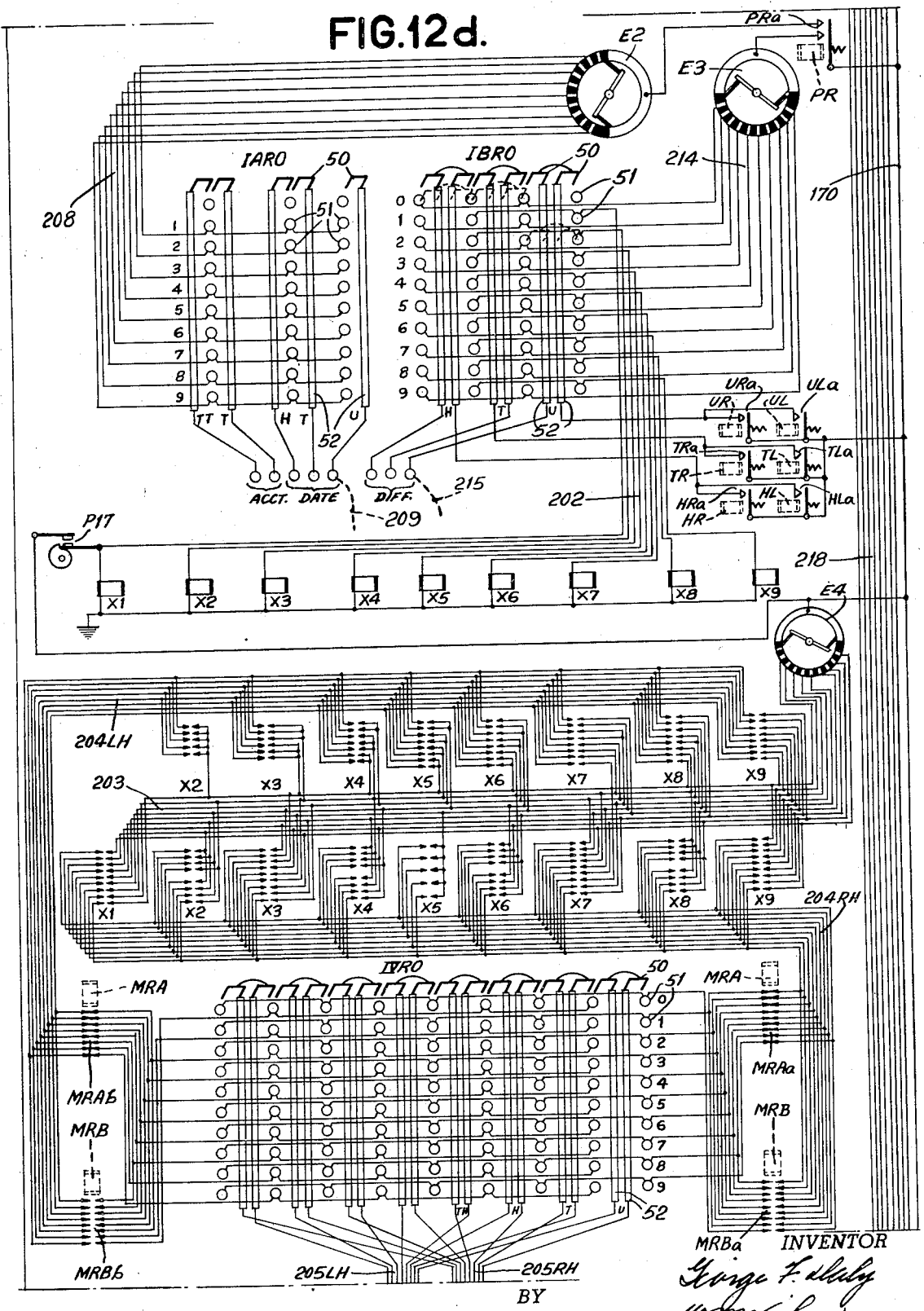

*First multiplying cycle.*—During the now ensuing multiplying cycle, cam contacts M1 close (Fig. 12f) and energize magnet UR which closes contacts URa (Fig. 12d). It may here be stated that the device identified as IBRO designates the readout device of accumulator IB on which the amount standing in the accumulator is represented by the position of brushes 50 with respect to segments 51 and common strips 52. Thus for the example chosen the units order brush 51 of IBRO is set to connect the 2 segment 51 of the units column with units order common strip 52 as shown in dotted lines. Thus, when contacts URa close, a circuit is traceable from line 170, contacts URa, left hand units strip 52, brush 51, 2 segment 51, wire 202, magnet X2 to ground. The multiplier of 2 is thus selected to function during the first of the six multiplying cycles and to control entry of the right hand partial products of 2 times the amount standing in accumulator IV into accumulator VII. The actual multiplying devices are of the well known arrangement comprising sets of contacts closed by related X magnets, an emitter E4, a readout device IVRO upon which the multiplicand is set and column selecting contacts shown at the top of Fig. 12e. Concurrently with closure of contacts URa, a set of contacts URb (Fig. 12e) are also closed to direct the entries into proper orders of accumulator VII, so that as emitter E4 rotates circuits will be completed from line 170, emitter E4, a set of wires 203, lower set of X2 contacts, which are connected to wires 203 in accordance with the 2 times multiplication table, wires 204RH, normally closed contacts MRa, accumulator IV, readout device IVRO, a set of wires 205RH (Fig. 12e), a set of wires 206RH, contacts URb to adding magnets 44 of accumulator VII and to ground.

After the entry part of this cycle, the X2 contacts open as well as the UR contacts.

*Second multiplying cycle.*—At the beginning of this cycle, cam contacts M2 (Fig. 12f) close to energize magnet UL whose contacts ULa (Fig. 12d) close to complete a circuit which again energizes magnet X2, and now left hand partial products are entered from emitter E4, wires 203, upper X2 contacts, wires 204LH, contact MRAb, IVRO, wires 205LH (Fig. 12e), wires 206LH, contacts ULb (now closed) to appropriate adding magnets 44 of accumulator VII.

*Third to sixth multiplying cycles.*—The remaining multiplying cycles are repetitions of the first two with cam contacts M3 to M6 (Fig. 12f) energizing the magnets TR, TL, HR, and HL in order, to select the X magnet corresponding to the tens digit during the third and fourth cycle and the X magnet corresponding to the hundreds digit during the fifth and sixth cycles, and alternating the entry of right and left hand components into accumulator VII so that at the end of the sixth cycle the complete product of the amount in accumulator IV times the amount in accumulator IB is contained in accumulator VII.

*Multiplication of negative balances.*—If upon the initiation of multiplying operations the balance shown on the wheels and standing on the readout device of accumulator IV is a negative value, this fact will be detected by the presence of a 9 in the highest order wheel of accumulator IV. The special readout device for this wheel is shown in Fig. 12f. With the related brush 50 in this order standing at 9, a circuit is completed near the end of the date transfer cycle as follows: From line 170, cam contacts L15, R1q, common 52, brush 50, "9" segment 51, wire 207, and magnets R28, MRA, MRB, and MRC in parallel to ground. Magnet R28 closes its contacts R28a to establish a holding circuit through contacts P8 which hold these magnets energized until a later total cycle. Magnet MRA opens its contacts MRAa and MRAb (Fig. 12d) and magnet MRB closes its contacts MRBa and MRBb. This has the effect of reversing the connections between wires 204RH and segments 51 and between wires 204LH and the segments, so that since the amount standing on IVRO is a true nines complement, such reversal will cause the partial products of the true positive value times the day difference to be entered into accumulator VII during the multiplying cycles.

*Initiating total print and reset cycles.*—During the sixth multiplying cycle cam contacts M8 (Fig. 12a) open to denergize the clutch magnet 87 and magnet R2, so that the various R2 contacts will return to the positions shown in the circuit. With both magnets R1 and R2 deenergized, following the multiplying cycles, their associated contacts R2b and R1b will be closed so that, since minor control magnet contacts R7a are still closed at this time, a circuit will be completed from line 170, wire 195, contacts R1b, R2b, R7a, L8, relay magnet R29, magnet LC to ground. Magnet R29 closes its contacts R29a in the reset magnet circuit, and the magnets 70 and 24 will become energized and through the mechanism controlled thereby will elevate the type bars and cause the shaft controlling the P contacts to function. Printing now takes place from accumulators IA, IB, II, and IV for the example chosen. Concurrently therewith, the product in accumulator VII is transferred to accumulator V and printed in its related printing section as on the first line of Fig. 8a.

*Printing from accumulator IA.*—Upon commencement of the total printing cycle, cam contacts P16 (bottom of Fig. 12f) close to energize relay magnet PR and keep the magnet energized while the type bars rise to printing position. Magnet PR closes contacts PRa (top of Fig. 12d) to connect emitters E2 and E3 to line 170. In Fig. 12d, IARO represents the readout device of accumulator IA whose brushes 50 are set in accordance with the account number and date as derived from the first card of the group. A representative printing circuit is traceable from line 170 (Fig. 12d), contacts PRa, emitter E2 whose brush is in constant rotation, one of a group of wires 208, segment 51, brush 50, common strip 52; thence through a plug connection 209 (see also Fig. 12c), contacts R30a now closed as will be explained, to the print magnet 36 and thence to ground. Printing circuits are concurrently completed through all orders of the accumulator in this well known manner.

*Total print selection.*—Before the printing circuits just described can be completed, it is necessary to energize the relay magnet R30. This is done through the device shown in Fig. 12f where for each of the accumulators there is a switch generally designated 210 whose rotatable brush 211 may be set at a position designated "minor" or in a position designated "major." A single switch is provided for the accumulators IA and IB. When a brush is set in the minor position, the related accumulator is to print and reset on a minor group change and, when the brush is set in the major position, the accumulator is to print and reset on a major group change. Accordingly, for the problem under consideration the several switches 210 are set in the positions shown in Fig. 12f. At the beginning of the total print cycle, cam contacts P6 (Fig. 12f) close connecting a wire 212 to ground and causing energization of relay magnet R30 whose related switches 210 are set in the minor position. A representative circuit is traceable from line 170, uppermost relay magnet R30, contact segments 213, lower brush 211, wire 212, contacts P6 to ground.

*Printing from accumulator IB.*—The date difference standing in readout device IBRO is also to be printed. For this purpose the IBRO device is constructed as a so-called "double readout" of two sections, one of which has already been mentioned as controlling the selection of the X multiplying relays. The other section has its segments 51 connected through a group of wires 214 to emitter E3, so that as the emitter rotates circuits will be completed from line 170, contacts PRa, emitter E3, wires 214, readout device IBRO, plug connection 215 (see also Fig. 12c), relay contacts R30a, print magnet 36 to ground. In this manner the difference is printed along with the account number and date of the card.

*Printing from accumulators II and III.*—The readout device for accumulators II and III is shown in Fig. 12c where the segments 51 are connected through a group of wires 216 to emitter E5. With the related R30 energized so that the contacts R38 are closed, circuits will be completed from line 170, wire 217, emitter E5, wires 216, readout device IIRO, IIIRO, contacts R30a, print magnets 36 to ground. For the problem under consideration, there is no entry in accumulator III so that only the amount 100 standing in the accumulator II will be printed.

*Printing from accumulator IV.*—Referring to Fig. 12d, closure of cam contacts P17 causes energization of the relay magnet X1 and consequent closure of its related contacts. At the top of Fig. 12e energization of magnet PR has resulted in the closure of contacts PRd. As a result, the amount standing in the readout device IVRO of accumulator IV will control its related printing magnets to circuit connections extending from line 170 (Fig. 12d), through emitter E4, a group of wires 203, contacts of magnet X1, group of wires 204RH, normally closed relay contacts MRAa, IVRO brushes and segments, group of wires 205RH (Fig. 12e), group of wires 206RH, contacts PRD, group of wires 217, upwardly across Fig. 12d to Fig. 12c and thence through print magnets 36 related to accumulator IV and then to ground. It is to be noted that the printing of the amount standing in accumulator IV is in effect operation of multiplying by 1 with the circuits controlling print magnets instead of adding magnets.

*Printing negative balance from accumulator IV.*—In the foregoing it was assumed that the amount standing in accumulator IV was a positive amount. Where the amount standing therein is a complement, it will be recalled that magnets MRA, MRB and MRC (Fig. 12f) were energized and held through contacts P8, as a result of the detection of a negative balance standing on accumulator IV, so that during a printing cycle contacts MRAa (Fig. 12d) are open and contacts MRBa are closed. This results in the inversion of the circuits going through IVRO so that the negative amount standing therein will be printed as its equivalent true number.

*Printing and transferring from accumulator VII.*—Referring to Fig. 12f, during the last multiplying cycle contacts M7 close to energize relay magnet MP which closes its contacts MPa to provide a holding circuit through cam contacts P8. As a result, relay contacts MPb (Fig. 12e) are shifted from the position shown during the printing cycle so that, as emitter E6 rotates, circuits are completed from line 170, emitter E6, group of wires 219, readout device VIIRO to cable 220, lower contacts MPb, normally closed upper contacts MRCb, cable 221, to adding magnets 44 of accumulator V to ground. A parallel circuit also extends through upper contacts R30c to printing magnets 36 and to ground. Thus, the product standing on the VIIRO device controls both the adding and printing magnets of accumulator V. If the product standing in VIIRO represented the multiplication of a negative balance by the date difference, relay magnet MRC would be energized during the printing operation as explained so that its contacts MRCb would be in shifted position in Fig. 12e and the circuits extending from the VIIRO device through cable 220 would continue through lower contacts MPB, lower contacts MRCb, cable 222 and thence through adding magnets 44 of accumulator VI and to ground. These circuits will also branch through the upper contacts of a set of contacts R30c to the corresponding print magnets 36 of accumulator VI.

At the end of this print cycle, therefore, the first line of the report in Fig. 8a will have been printed and as explained, if the amount standing in accumulator IV were a credit or a negative amount, the amount standing in accumulator VII would have been transferred to accumulator VI and printed in the printing section related to that accumulator.

*Resetting accumulators IA, IB, II, III, VII.*— These accumulators are to be reset following the printing cycle under control of their reset control magnets 223 (Fig. 12f) which will be energized when their related switches 210 are set in minor position. These magnets 223 correspond to magnet 162 shown in Fig. 8 of Patent No. 1,976,617 and serve to couple the adding wheels to the resetting mechanism. A representative energizing circuit for magnet 223 is traceable from line 170 (Fig. 12f), minor control relay contact R7d closed upon a minor group change, wire 224, lowermost magnet 223 for example, switch segments 224 and upper brush 211, segments 225, wire 226 to ground. It is to be noted that the switch 210 of accumulator IV is set at "minor" but the circuit to its magnet 223 is not completed because included therein are contacts MAc which are open at this time. The actual resetting of the accumulators takes place in the second of the two total taking cycles designated "minor total and reset" (Fig. 11a). Accordingly, at the end of the reset cycle the accumulator IV contains the credit balance 100 and accumulator V contains the amount 200 representing the sum and daily balances for the first and second days. Toward the end of the reset cycle cam contacts P3 close (Fig. 12a) to reenergize the minor control relays MI, R7 and R8. This causes opening of contacts R7a so that relay magnet LC is deenergized, enabling the closure of its contacts LCb.

*Automatic resumption of card feeding.*—Cam contacts P1 are provided to energize the start relay magnet R10 near the end of the resetting operations, at which time the several series connected relay contacts R2c, R1m, LCb will be closed and the circuit therefor will be completed through magnet R10 which will cause energization of the relay magnet R11 as explained to energize the card feed clutch magnet 18. The circuits involved in the starting of the machine have already been traced in detail, and the operations controlled thereby will proceed in the same manner as explained above, that is, the second card of the group bearing the date 3 will now pass the lower brushes LB, while the third card of the group which also bears the date 3 will pass the upper brushes. As the cards with the date 3 are sensed by brushes LB, the amounts thereon will be entered into accumulators II, III and IV accordingly as the amounts represent debit or credit values. From the first card only of this date 3 group the account number and date will be entered into the accumulator IA, and the complement of the date will be entered into the accumulator IB. The date on the card sensed by the upper brushes will be set up in the date relays and restored for each card until the group control mechanism detects the next minor group change between date 3 and date 7. At such time the date 3 will stand in accumulator IB and the date 7 will stand on the date relays. From this point on, operations are substantially the same as traced in detail following the first minor group change. This time the difference of 4 is found as a result of the date transfer cycle so that, during the six multiplying cycles the credit balance of 300 is multiplied by 4 to obtain the product 1200 in accumulator VII. The appropriate relays R28, etc., are set up to indicate that the balance is negative in order that in the following print cycle, during which the second line of the report in Fig. 8a is printed, the product is transferred from the accumulator VII to accumulator VI and printed in the latter's related printing section. Again, the accumulators IA, IB, II, III and VII are reset and card feeding resumes.

*Date difference of 1.*—When upon a minor group change and the subsequent date transfer operations the difference standing in accumulator IB is 1, total printing and resetting operations follow immediately after the date transfer cycle with no intervening multiplying operations. This is brought about as follows. It will be recalled that where there was a difference greater than 1, the wheels 106 (Fig. 12a) enable the completion of a circuit to relay magnet R25 which in turn causes energization of multiplying clutch magnet 87 and relay R2. This circuit cannot be completed from line 170, wire 195, contacts R1b, R2b, R7a, L8, relay magnets R29 and LC to ground. As already explained, magnet R29 closes its contacts R29a to complete the reset magnet 70 and print magnet 24 circuits. In the same manner as already described, printing takes place from accumulators IA, IB, II, and III. Printing from accumulator IVRO also takes place through the circuits controlled by the multiplying magnet X1 (Fig. 12d) and contacts MRAa, if the balance in the accumulator is positive, or through contacts MRBa if the balance is negative, in the same manner as before. The product accumulator VII contains no entry so that there is no transfer or printing circuits controlled thereby. Instead, the amount standing in accumulator IV is transferred to accumulator V if positive and accumulator VI if negative, with accompanying printing in the related section of the latter accumulators. Assuming the balance to be positive, the circuits through which the amount in IVRO is entered into accumulator V may be traced.

Figure 12E:
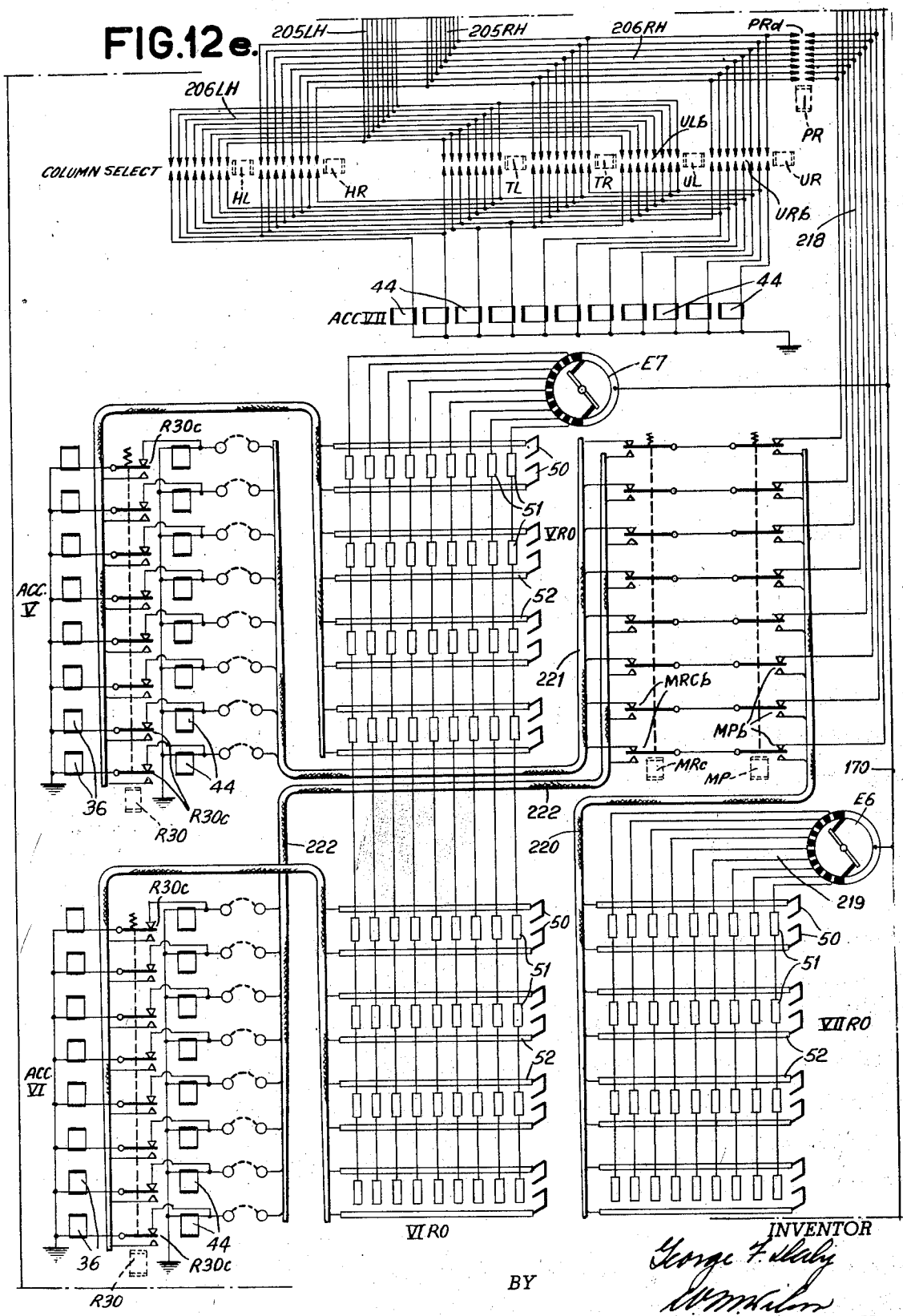

Referring to Fig. 12e, the relay contacts MPb are in the position shown, since their controlling magnet MP is deenergized at this time. The circuits through which the amount standing in IVRO pass include the contact PRd (Fig. 12e) from which they branch upwardly through wires 218 to control printing in the section relating to accumulator IV. These circuits now also continue downwardly through wires 218, through the upper contacts MPb, upper contacts MRCb, cable 221, thence to the adding and printing magnets 44 and 36 respectively of accumulator V. If the balance were negative, magnet MRC would be energized during this operation so that the circuits would pass through the lower contacts MRCb to continue through cable 222 to the print and add magnets 36 and 44 respectively of accumulator VI. After the printing operation, the accumulators are again reset as before with the exception of accumulators IV, V and VI when card feeding resumes.

Briefly recapitulating with reference to Fig. 8a, whenever a minor group change is detected, the machine enters upon a date transfer cycle of operations in which the difference between the dates of two successive groups is obtained. If this difference is greater than 1, the machine enters upon six multiplying cycles of operation, during which the partial products of the multiplicand, which is the amount standing in accumulator IV, is multiplied by the multiplier which is the amount standing in the accumulator IB and entered into the products accumulator VII to obtain the product of these two factors as a true number, regardless of whether the multiplicand is a positive or negative amount. After the multiplying cycles of operation, a total printing cycle takes place during which the amounts standing in accumulators IA, IB, II, III and IV are printed directly from the readout device in these accumulators. During the same cycle the product standing in accumulator VII is transferred to either accumulator V or VI and concurrently printed in the related printing section.

If the difference obtained during the date transfer cycle is 1, the machine does not go through any multiplying operations but enters upon the total printing cycle immediately, during which the accumulators IA, IB, II, III and IV control printing as before. During the same cycle the amount in accumulator IV is transferred into either accumulator V or VI and printed in the related section.

*Major group change.*—When the last card of a major group whose account number is 17 has passed the lower brushes and the first card in the next succeeding group has passed the upper brushes, the group control mechanism will have detected the change in account number and caused deenergization of the control magnets MI, R7, R8 and MA. As before, upon a group change the machine enters upon the date transfer cycle of operations. This time, however, the date relays do not control entering into accumulator IB, instead a transfer to the accumulator is made from dial switches designated 227 (Fig. 12b). These switches are manually set before the machine is operated to represent a day numeral which is generally one higher than the last day of the accounting period for which the report is being tabulated. Upon deenergization, magnet MA and its contacts MAb return to the position shown at the bottom of Fig. 12b so that the adding magnets of accumulator IB are now connected to the dial switches 227 and disconnected from the date relay contacts R20b. As already pointed out, relay magnet R1 is energized during the date transfer cycle, so that now circuits are completed from line 170, contacts R1n, the emitter E1, dial switches 227, to denominational order wires 228, upper contacts MAb, lower contacts R1c, lower contact R1e to the adding magnets 44 of accumulator IB. At the end of this cycle as before, the setting of the disks 106 in Fig. 12a determines whether the difference is 1 or more than 1, and the machine enters upon multiplying cycles and then a total print and reset cycle or immediately upon the total print and reset cycle concurrently, during which printing takes place on the form of Fig. 8a as, for example, on the next to the last line thereof, and resetting of accumulators IA, IB, II, III and VII also takes place. At this time, contacts MAc (Fig. 12f) are closed, so that reset magnet 223 of accumulator IV is also energized and resetting of accumulator IV takes place. Near the end of the reset cycle the major relay magnet MA is reenergized through closure of cam contact P2 (Fig. 12a). Earlier and before the end of the cycle, cam contacts P10 (Fig. 12f) close, completing a circuit from line 170, minor control relay contacts R7d which are still closed, relay magnet R31, contacts P10 to ground. Contacts R31 close to provide a holding circuit from line 170, contacts R7d, magnet R31, contacts R31a, wire 230 to ground. Contacts R31b are, therefore, held in closed position while the second total printing reset cycle takes place. As a result, when cam contacts P6 close, a circuit is completed from ground, through cam contacts P6, wire 212, contacts R31b, to wire 231 which connects two segments 232 of the switches 210; for example, as in the switch associated with accumulator VI. In those positions in which the brush 211 is set at major, the circuit continues through the segments 232 and lower brush 211 to energize the related relay magnets R230. The corresponding reset magnets 223 are energized through circuits from line 170, contacts R7d, wire 224, reset magnet 223, segments 232, upper brush 211, wire 233, contacts R31a, wire 230 to ground. Thus, upon the second total print and reset cycle, magnets R30 and 223 related to accumulators V and VI are energized. Also during this cycle, contacts P3 (Fig. 12a) close to reenergize the minor control magnets MI, R7 and R8 and as before card feeding resumes to advance the first card of the new account number group past the lower brushes.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by record cards containing designations representing dates, said cards being arranged in order of successive dates, said machine having sensing means for sensing the date designations, and group control mechanism responsive to the sensing of a change in date between successive cards, the combination of an accumulator controlled by part of said sensing means to receive the dates of a card in the form of a complement, a settable device concurrently controlled by another part of said sensing means to receive the date of the next following card, means controlled by said settable device to transfer the date therein to said accumulator to obtain the difference in date values in said accumulator, means controlled by said group control mechanism upon a change in date for rendering the last named means effective, a balance accumulator settable to represent a balance, a second accumulator, a product accumulator, multiplying means controlled by said first named accumulator and said balance accumulator for forming in said product accumulator the product of the balance times the date difference, means for transferring the balance from said balance accumulator to said second accumulator, means controlled by the first named accumulator and effectivee when the date difference is obtained, for ascertaining whether the differeence is unity or more than unity, and means controlled by said ascertaining means for selectively rendering either the multiplying or the transferring means effective.

2. In a cyclically operable machine controlled by record cards containing designations representing account numbers and dates, said cards being arranged in order of successive dates, said machine having sensing means for sensing the date designations and group control mechanism responsive to the sensing of a change in date between successive cards, the combination of an accumulator, entering means therefor arranged to enter amounts directly or in the form of complements, a settable device arranged to receive date entries, means controlled by a part of the sensing means for entering the date on the first card into said accumulator in the form of a complement, means concurrently controlled by another part of the sensing means to enter the date on the second card into said settable device directly, means controlled by said group control mechanism when the dates on the first and second cards are unlike for causing the date in the settable device to be transferred directly into said accumulator to obtain the difference therein, multiplying mechanism for multiplying two amounts and obtaining their product, transferring mechanism for transferring an amount from one entry receiving device to another, means controlled by said accumulator for ascertaining whether the difference in said accumulator is unity, and means controlled by said ascertaining means when the difference is unity, for effecting an operation of said transferring mechanism and when the difference is not unity for effecting an operation of said multiplying mechanism.

3. The invention set forth in claim 2 in which control means is provided and controlled by the sensing means for suppressing the operation of the entering means of the accumulator to prevent further entries into the accumulator after the first card date and control means for resetting the settable device after each entry therein, said group control mechanism causing suppression of the operation of said resetting control means upon a group change whereby, when several cards contain the same date, the accumulator contains the complement of said date from the first card and the settable device contains the date of the first card containing a different date.

4. The invention set forth in claim 2 in which a further group control mechanism responsive to major group changes in account numbers is provided and in which a manually settable device set to represent a date is provided, means for transferring the date in said manually settable device to said accumulator and means controlled by said major group control mechanism upon a major group change for suppressing the transfer from the first named settable device and for rendering effective the means for transferring the date from said manually settable device to said accumulator.

5. In a machine having a plurality of record card controlled accumulators and group control means for automatically interrupting the card control of the accumulator operation upon a change in the record card groups, the combination of means for transferring an amount from one accumulator to a second accumulator, multiplying means controlled by said first named accumulator and a third accumulator for obtaining the product of their amounts in a further accumulator, means for causing the product to be subsequently transferred from said further accumulator to said second accumulator, means controlled by said third accumulator for ascertaining whether the amount therein is unity, means for rendering said ascertaining means effective upon a group change, and means controlled by said ascertaining means for selectively rendering either the transferring means or the multiplying means and its subsequent transferring means effective.

6. In a cyclically operable machine controlled by record cards containing designations representing account numbers and dates, said cards being arranged in order of successive dates, said machine having sensing means for sensing the date designations and group control mechanism responsive to the sensing of a change in date between successive cards, the combination of an accumulator, entering means therefor arranged to enter amounts directly or in the form of complements, a settable device arranged to receive date entries, means controlled by part of the sensing means for entering the date on the first card into said accumulator in the form of a complement, means concurrently controlled by another part of the sensing means to enter the date on the second card into said settable device directly, means controlled by said group control means when the dates on the first and second cards are unlike for causing the date in the settable device to be transferred directly into said accumulator to obtain the difference therein, a further accumulator, multiplying mechanism controlled by said first named accumulator and said further accumulator, and means for rendering said multiplying mechanism effective after said difference has been obtained.

7. In a cyclically operable machine controlled by record cards containing designations representing account numbers and dates, said cards being arranged in order of successive dates, said machine having sensing means for sensing the date designations and group control mechanism responsive to the sensing of a change in date between successive cards, the combination of an accumulator, entering means therefor arranged to enter amounts directly or in the form of complements, a settable device arranged to receive date entries, means controlled by part of the sensing means for entering the date on the first card into said accumulator in the form of a complement, means concurrently controlled by another part of the sensing means to enter the date on the second card into said settable device directly, means controlled by said group control means when the dates on the first and second cards are unlike for causing the date in the settable device to be transferred directly into said accumulator to obtain the difference therein, a balance accumulator controlled by part of said sensing means to algebraically add amounts derived from the cards, a product accumulator, multiplying means controlled by said first named accumulator and said balance accumulator for obtaining the product of their amounts as a true number in said product accumulator, and means for rendering said multiplying means effective after said difference has been obtained.

8. In a machine controlled by record cards containing designations representing dates, said cards being arranged in order of successive dates, said machine having sensing means for sensing the date designations, and group control mechanism responsive to the sensing of a change in date between successive cards, the combination of an accumulator controlled by part of said sensing means to receive the dates of a card in the form of a complement, a settable device concurrently controlled by another part of said sensing means to receive the date of the next following card, means controlled by said settable device to transfer the date therein to said accumulator to obtain the difference in date values in said accumulator, means controlled by said group control mechanism upon a change in date for rendering the last named means effective, a balance accumulator settable to represent a balance, a second accumulator, a product accumulator, multiplying means controlled by said first named accumulator and said balance accumulator for forming in said product accumulator the product of the balance times the date difference, means for transferring the balance from said balance accumulator to said second accumulator, means controlled by the first named accumulator and effective when the date difference is obtained, for ascertaining whether the difference is a predetermined amount or different from said predetermined amount, and means controlled by said ascertaining means for selectively rendering either the multiplying or the transferring means effective.

GEORGE F. DALY.